United States Patent
Kent et al.

(10) Patent No.: US 11,149,427 B2
(45) Date of Patent: *Oct. 19, 2021

(54) TESSELLATION SQUARE MODULE AND UNDERGROUND STORAGE SYSTEM

(71) Applicant: Bio Clean Environmental Services, Inc., Oceanside, CA (US)

(72) Inventors: Zachariha J. Kent, San Antonio, TX (US); John Scott, Fallbrook, CA (US)

(73) Assignee: Bio Clean Environmental Services, Inc., Oceanside, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/537,585

(22) Filed: Aug. 11, 2019

(65) Prior Publication Data

US 2019/0360190 A1    Nov. 28, 2019

Related U.S. Application Data

(63) Continuation of application No. 16/214,464, filed on Dec. 10, 2018, now abandoned, which is a
(Continued)

(51) Int. Cl.
*E03F 1/00* (2006.01)
*E02B 11/00* (2006.01)
(Continued)

(52) U.S. Cl.
CPC ............... *E03F 1/005* (2013.01); *B65G 5/00* (2013.01); *E03B 11/14* (2013.01); *E03F 1/002* (2013.01);
(Continued)

(58) Field of Classification Search
CPC .......... E02F 1/003; E02F 1/005; E02B 11/00; E02B 11/005; E03F 1/003; E03F 1/005
See application file for complete search history.

(56) References Cited

U.S. PATENT DOCUMENTS

D201,340 S    6/1965    King
D236,673 S    9/1975    Ehrman
(Continued)

FOREIGN PATENT DOCUMENTS

CA    2462101    2/1949
DE    4400183    7/1995
(Continued)

OTHER PUBLICATIONS

Suzuki, Michiko, "Water Storage Device for River Utilization", Translation S60-92527 (Original Doc. published May 24, 1985), 8 pages.
(Continued)

Primary Examiner — Frederick L Lagman
(74) Attorney, Agent, or Firm — Steven W. Webb

(57) ABSTRACT

Individual square shaped modules used in an assembly for underground storage of storm water and other fluid storage needs. Modules are assembled into a resultant square tilling shape for maximized structural strength and material use efficiency. Internal square shaped modules are assembled and encased by external square shaped modules. Internal adjacent modules are in direct fluid communications with one another through a channel-less chamber. Internal square shaped modules drain into square shaped modules chamber where fluid is either stored or drained. Assemblies include various top and side pieces along with access ports for entry into said assembly.

41 Claims, 33 Drawing Sheets

Related U.S. Application Data continuation of application No. 15/782,961, filed on Oct. 13, 2017, now Pat. No. 10,151,096, which is a continuation-in-part of application No. 15/657,253, filed on Jul. 24, 2017, now Pat. No. 10,151,083, and a continuation-in-part of application No. 29/611,522, filed on Jul. 21, 2017, now Pat. No. Des. 828,902, and a continuation-in-part of application No. 29/611,524, filed on Jul. 21, 2017, now Pat. No. Des. 828,903, which is a continuation-in-part of application No. 15/135,514, filed on Apr. 21, 2016, now Pat. No. 9,732,508.

(60) Provisional application No. 62/394,118, filed on Sep. 13, 2016.

(51) Int. Cl.
| | | |
|---|---|---|
| *B65G 5/00* | (2006.01) | |
| *F17C 3/00* | (2006.01) | |
| *E03B 11/14* | (2006.01) | |
| *E03B 3/03* | (2006.01) | |
| *E21D 13/00* | (2006.01) | |

(52) U.S. Cl.
CPC ............ *F17C 3/005* (2013.01); *E02B 11/005* (2013.01); *E03B 3/03* (2013.01); *E21D 13/00* (2013.01); *F17C 2203/0612* (2013.01)

(56) References Cited

U.S. PATENT DOCUMENTS

| | | | |
|---|---|---|---|
| 4,239,416 A | 12/1980 | Borca et al. | |
| 4,363,563 A | 12/1982 | Hallenius | |
| 4,708,523 A | 11/1987 | Sagefores et al. | |
| 5,017,042 A | 5/1991 | Minor | |
| 5,387,741 A | 2/1995 | Shuttle | |
| 5,542,780 A | 8/1996 | Kourgli | |
| 5,810,510 A | 9/1998 | Urriola | |
| 5,848,856 A | 12/1998 | Bohnhoff | |
| 6,095,718 A | 8/2000 | Bohnhoff | |
| 6,419,421 B1 | 7/2002 | Whitfield, Jr. | |
| 6,428,870 B1 | 8/2002 | Bohnhoff | |
| 6,514,009 B2 | 2/2003 | Northcott | |
| 6,626,609 B1 | 9/2003 | Kotani et al. | |
| 6,962,464 B1 | 11/2005 | Chen | |
| 6,991,402 B2* | 1/2006 | Burkhart | E03F 1/005 405/126 |
| 7,080,480 B2 | 7/2006 | Urban | |
| 7,160,058 B2* | 1/2007 | Burkhart | E03F 1/005 405/126 |
| 7,344,335 B2* | 3/2008 | Burkhart | E03F 1/005 405/126 |
| 7,591,610 B2 | 9/2009 | Krichten | |
| 7,621,695 B2* | 11/2009 | Smith | E03F 1/005 210/170.03 |
| D617,867 S | 6/2010 | May | |
| D635,639 S | 4/2011 | Dzwonczyk | |
| D651,278 S | 12/2011 | Graves | |
| D654,556 S | 2/2012 | McIntosh | |
| 8,162,567 B2 | 4/2012 | Obermeyer | |
| 8,256,991 B2 | 9/2012 | Dickinson, III et al. | |
| 8,360,100 B2 | 1/2013 | Burkhart, Sr. | |
| 8,590,564 B2 | 11/2013 | Burkhart, Sr. | |
| 8,770,890 B2 | 7/2014 | May et al. | |
| 9,428,880 B2 | 8/2016 | May et al. | |
| D767,924 S | 10/2016 | Livingston | |
| 9,580,899 B2 | 2/2017 | Rotondo | |
| D786,510 S | 5/2017 | Murljacic | |
| D795,384 S | 8/2017 | Kent | |
| D795,385 S | 8/2017 | Kent | |
| 9,732,508 B1 | 8/2017 | Kent | |
| D810,857 S | 2/2018 | Zarraonandia | |
| D810,858 S | 2/2018 | Zarraonandia | |
| 9,951,508 B2 | 4/2018 | May et al. | |
| 10,151,083 B2* | 12/2018 | Kent | E03F 1/002 |
| 10,151,096 B2* | 12/2018 | Kent | F17C 3/005 |
| 10,267,028 B2 | 4/2019 | May et al. | |
| 2004/0076473 A1 | 4/2004 | Burkhart | |
| 2007/0053746 A1 | 3/2007 | Dickie | |
| 2007/0181197 A1 | 8/2007 | Krichten | |
| 2007/0217866 A1 | 9/2007 | Oscar | |
| 2008/0166182 A1 | 7/2008 | Smith | |
| 2009/0049760 A1 | 2/2009 | Stuck | |
| 2009/0279953 A1 | 11/2009 | Allard | |
| 2010/0021236 A1 | 1/2010 | Kreikemeier | |
| 2010/0226721 A1* | 9/2010 | May | E03F 1/002 405/126 |
| 2011/0253238 A1 | 10/2011 | Burkhart, Sr. | |
| 2014/0105684 A1 | 4/2014 | Allard | |
| 2014/0291221 A1 | 10/2014 | Adams | |
| 2016/0097175 A1 | 4/2016 | Parker | |
| 2016/0265209 A1 | 9/2016 | Graf | |
| 2016/0333566 A1 | 11/2016 | Zarraonandia | |
| 2017/0321397 A1 | 11/2017 | Kent | |
| 2017/0328052 A1 | 11/2017 | Kent | |
| 2018/0030712 A1 | 2/2018 | Kent | |

FOREIGN PATENT DOCUMENTS

| | | |
|---|---|---|
| FR | 2927913 A1 | 8/2009 |
| GB | 2417733 | 3/2006 |
| JP | S60-92527 | 5/1985 |
| JP | H5-280085 | 10/1993 |
| JP | H6-26091 | 2/1994 |
| JP | 07-166595 | 6/1995 |
| JP | H7-2475593 A | 9/1995 |
| JP | 20011931139 A | 6/2009 |
| WO | 2013159737 | 10/2013 |

OTHER PUBLICATIONS

Nitto Co., Ltd., "Retarding Basin Device", Translation H5-280085 (Original Doc. published Oct. 26, 1993), 13 pages.
Haneda Concrete Industry Co., Ltd., "Underground Structure for Rainwater Storage Infiltration", Translation H6-26091 (Original Doc. published Feb. 1, 1994), 14 pages.
Haneda Concrete Industry Co., Ltd., "Rainwater Storage and Infiltration Facility", Translation 07-166595 (Original Doc. published Jun. 27, 1995), 11 pages.
Asahi Concrete Works, Co, Ltd. "Rainwater Storage Tank", Translation H7-2475593 (Original Doc. published Sep. 26, 1995), 18 pages.
Ishikawajima Kenzai Kogyo KK, "Multiple Box Culvert and its Assembling Method", Translation 20011931139 (Original Doc. published Jun. 3, 2009), 7 pages.
Prefac Beton Environment SA, et al., "Prefabricated concrete element for forming rain water recovery reservoir in e.g. parking lot, has recess defining discharge channel for discharging rain water from upper face of plate towards lower ace of plate facing side of feet", Translation 2927913 (Original Doc. published Aug. 28, 2009), 11 pages.
Almanstoetter Juergen DIPL PHY, "Hexagonal drainage elements assembled as drainage lining for open refuse tip", Notification date Feb. 7, 2018, Translation DE9319264 U1 (Original Doc. published Jul. 6, 1995), 6 pages.

* cited by examiner

FIG. 11
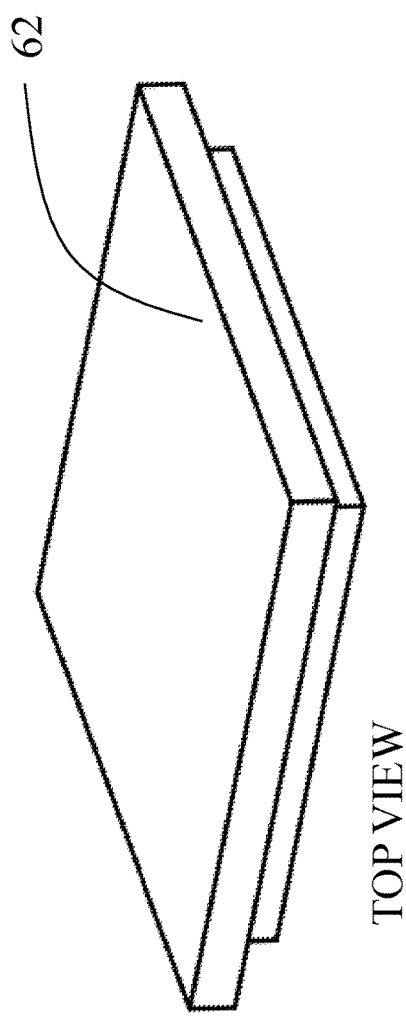
TOP VIEW
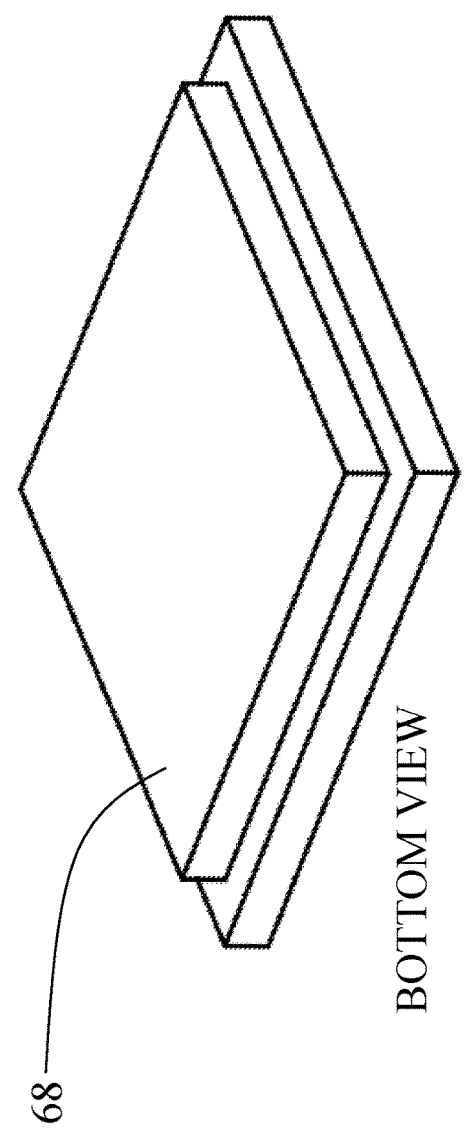
BOTTOM VIEW

TESSELLATION SQUARE MODULE AND UNDERGROUND STORAGE SYSTEM

CROSS-REFERENCE TO RELATED APPLICATION(S)

The present application is a Continuation of U.S. patent application Ser. No. 16/214,464 filed Dec. 10, 2018, now U.S. Pat. No. 10,626,580 which is a Continuation of U.S. patent application Ser. No. 15/782,961 filed Oct. 13, 2017, now U.S. Pat. No. 10,151,096, issued on Dec. 11, 2018, which is a Continuation-in-Part of U.S. patent application Ser. No. 15/657,253, filed on Jul. 24, 2017, now U.S. Pat. No. 10,151,083, issued on Dec. 11, 2018, which is a non-provisional of U.S. Provisional Patent Application No. 62/394,118 filed on Sep. 13, 2016 and a Continuation-in-Part of U.S. patent application Ser. No. 15/135,514, filed on Apr. 21, 2016, now U.S. Pat. No. 9,732,508, issued on Aug. 15, 2017. The present application is also a Continuation-in-Part of U.S. Design Patent Application Number 29/611,522, filed Jul. 21, 2017, now U.S. Design Patent Number D828,902, issued on Sep. 18, 2019; and U.S. Design Patent Application Number 29/611,524, filed Jul. 21, 2017, now U.S. Design Patent Number D828,903, issued on Sep. 18, 2019. Additionally, the subject matter of the present application is related to the following patent applications: U.S. Design Patent Application Number 29/567,711 filed on Jun. 10, 2016;-now patent number D795,383, issued on Aug. 22, 2017 and U. S. Design Patent Application Number 29/571,016, filed on Jul. 13, 2017, now patent number D795,385. The above-referenced applications, including the drawings, are specifically incorporated by reference herein in their entirety for all that they disclose and teach and for all purposes.

FIELD OF THE INVENTION

The embodiments of the present technology relate, in general, to the capture, storage, infiltration, and filtration of fluids, system and methods of using the same, including the subterranean water capture, storage, infiltration and filtration, system and methods of using the same. Although the present invention is described in context of stormwater storage and filtration, the invention is not so limited.

BACKGROUND

Fluid storage systems have been in existence for many years, specifically underground storage systems for the collection and storage of water. While water is collected underground for various reasons, over the past 20 years there has been increased focus on collecting and storing storm water runoff. This is done because of two main concerns. The quantity of storm water runoff is a concern because larger volumes of associated runoff can cause erosion and flooding. Quality of storm water runoff is a concern because storm water runoff flows into our rivers, streams, lakes, wetlands, and/or oceans. Larger volumes of polluted storm water runoff flowing into such bodies of water can have significant adverse effects on the health of ecosystems.

The Clean Water Act of 1972 enacted laws to improve water infrastructure and quality. Storm water runoff is the major contributor to non-point source pollution. Studies have revealed that contaminated storm water runoff is the leading cause of pollution to our waterways. As we build houses, buildings, parking lots, roads, and other impervious surfaces, we increase the amount of water that runs into our storm water drainage systems and eventually flows into rivers, lakes, streams, wetlands, and/or oceans. As more land becomes impervious, less rain seeps into the ground, resulting in less groundwater recharge and higher velocity surface flows, which cause erosion and increased pollution levels in water bodies and the environment.

To combat these storm water challenges associated with urbanization storm water detention, infiltration and retention methods have been developed to help mitigate the impact of increased runoff Historically, open detention basins, wetlands, ponds or other open systems have been employed to capture storm water runoff with the intention of detaining and slowly releasing downstream over time at low flows using outlet flow controls, storing and slowly infiltrating back into the soils below to maximize groundwater recharge or retain and use for irrigation or other recycled water needs. While the open systems are very effective and efficient, the cost of the land associated with these systems can make them prohibitive. In areas such as cities or more densely populated suburbs the cost of land or availability of space has become limited. In these areas many developers and municipalities have turned to the use of underground storage systems which allow roads, parking lots, and building to be placed over the top of them.

A wide range of underground storage systems exist, specifically for the storage of storm water runoff Arrays of pipes, placed side-by-side are used to store water. Pipe systems made of concrete, plastic or corrugated steel have been used. More recently arched plastic chamber systems have been in use. As with pipes, rock backfill is used to fill the space surrounding them to create added void areas for storing additional water along with providing additional structural reinforcement.

In general, these types of systems require at least one foot of rock backfill over the top and at least one or more feet of additional native soil over the top to support the loading associated with vehicles on streets and parking lots. These systems also require rock backfill of a foot or more around their perimeter sides to provide structural reinforcement due to lateral loading associated with soil pressure.

Lastly, these systems must also be placed on a rock base for structural support. Because these systems are rounded or arched, a substantial amount of rock backfill must be used to surround them and placed in between the systems. As such, the amount of void space available for storing water compared to the amount of soil required to be excavated is only around 60 percent.

Over time, plastic and concrete rectangular or cube shaped modular systems were developed that more efficiently stored storm water because the modules could be placed side-to-side and end-to-end without the need for additional rock backfill to be placed between each module as found with pipe and arched systems. With these rectangular and cube shaped systems the void space available for storing water compared to the amount of soil required to be excavated is up to 90% or more. While plastic type rectangular and cubed systems still require at least two feet of rock backfill over the top, two feet around the perimeter sides, and six inches underneath to handle downward and lateral loading, the concrete rectangular and cubed systems do not.

Concrete rectangular or cubed modular systems have the benefit of not requiring rock backfill over the top or surrounding the sides because of their additional strength when compared to plastic systems. For example, currently available concrete systems can have the bottom of the structure as deep as eighteen feet below surface level standard wall thickness. The thickness of the structure can increase from six inches to eight inches or more plus adding additional rebar reinforcement to allow for deeper installation.

Most concrete rectangular or cube shaped structures have five sides, four vertically extending walls and a bottom or top side. One side must be open because of how pre-cast concrete molds are made and how the concrete structure is pulled from the mold. At least one side of the concrete structure must be missing for it to be pulled from the metal mold that consists of inner and outer walls and either a top or bottom side.

Unfortunately, this missing side which is required for manufacturing, creates an inherent weak point for the walls. The middle of each wall, especially the longer walls for rectangular structures, where the wall meets the end of the missing top or bottom side has no perpendicular connection as with the opposite side of the same wall where it connects to the top or bottom side. This weak point on the center of each wall at the open end is the reason why these systems have depth limitations. This is known as deflection. This weak point becomes further exaggerated the taller the wall becomes and the longer it becomes; the further away it is from the perpendicular connecting floor or adjacent wall on the opposite end. Therefore, taller systems which extend down deeper from the surface underground run into a compounding problem of taller walls and increased lateral loading (soil pressure).

Recently, an approach to the aforementioned technical problem has been to replace solid wall chambers with cantilever, or semi-arched arm braces, to support the top module. This approach falls short of addressing common problems in the industry as these systems still cannot sustain increased soil pressure and lateral loading due to its shape without need to increase the wall thickness of the modules or increase the amount of rebar reinforcing therefore increasing material and overall cost of deep installations. The present technology presents a novel approach to addressing common industry limitations.

The need for a system overcoming these inherent shape-related limitations is evident. The present invention provides an exemplary solution including the method, system, and apparatuses derived from principles of biomimetics; specifically, the employment of tesselated modular assembly. The construction of interlinking mosaic shapes and material layering increases the strength of the modular assembly by reducing crack propagation; thereby allowing the assembly to be underground at greater depths than underground water storage systems known in the art. This type of geometric arrangement also overcomes potential structural weakness of an individual module, as a result of manufacturing errors or transport mishaps. Mosaic configurations disclosed herein also mitigate swelling pressure of ambient soil due to the segmentation design. Paving roads with small segmented materials such as brick or paving stones, as an example, has long been utilized to withstand soil swelling.

Design inspired by these efficient structures found in nature and the employment these more economic natural shapes, in combination with current precast concrete design processes, present a unique approach for overcoming the limitations of the previous approaches in the industry.

SUMMARY

The invention provides an exemplary method, system, and apparatuses depicted, in one of its many embodiments, as a module and an assembly of modules for collection, storage, infiltration, and treatment of liquid. In accordance with certain embodiments, an improved modular, underground square shaped module(s) design and resulting tesselated modular assemblies and related components is disclosed. The arrangement of modules creating interlinking mosaic shapes and concrete material layering creates a tesselated structure for maximized strength. Tesselation provides superior strength on all sides of each module and the assembly as a whole when compared to any rectangular or cubed shaped module known in the art. Its ability to equally distribute loads from the earth on its sides allows it to be installed deeper with reduced wall thickness and rebar reinforcing.

In accordance with preferred embodiments, an improved modular, underground square shaped module(s) design and resulting tesselated assemblies and related components with three modular configurations including internal, perimeter, and corner modules.

In accordance with certain embodiments, an improved modular, underground square shaped module(s) design and resulting tesselated assemblies and related components for collection and storage of storm water.

In accordance with certain embodiments, an improved modular, underground square shaped module(s) design and resulting tesselated assemblies and related components for infiltration of storm water by utilizing channel-less water flow patterns and a porous base or holes in the floor and/or outflow pipes.

In accordance with certain embodiments, an improved modular, underground square shaped module(s) design and resulting tesselated assemblies and related components for the storage, treatment and infiltration of and other collected and stored, non-flammable fluid needs are provided.

In accordance with certain embodiments, a square shaped module(s) design and resulting tesselated shaped assemblies and related components with internal square modules placed within external square modules; wherein the internal modules have legs and optional side walls, wherein the external square modules have a combination of legs and walls.

In accordance with other embodiments, a square shaped module(s) design and resulting tesselataed assemblies and related components with internal square modules placed within external square modules; wherein the internal modules have legs and no side walls, wherein the external square modules have a combination of legs and walls.

In accordance with some embodiments, assembly can be configured into various shapes and sizes, all being of a square shape, and are useful for meeting the size, space and shape restrictions of locations where the assemblies are being installed.

In accordance with yet another embodiment, assembly of the square modules and their components may be arranged into squares, rectangles, L shapes, S shaped, U shaped and other shapes required to fit within the construction site constraints.

It should be appreciated that embodiments of the present technology are disclosed herein, with the preferred embodiment for the management of storm water runoff underground.

Further embodiments will be apparent from this written description and accompanying figures.

BRIEF DESCRIPTION OF THE DRAWINGS

FIG. 11 illustrates three-dimensional top and bottom view of a top slab layered with a notch down, in accordance with one embodiment.

DETAILED DESCRIPTION

The present embodiment provides a tesselated module and assembly of modules for the underground collection and storage of fluids. Tesselated modules offer enhanced strength due to the interlinking and multi-layering design. Modules can be assembled into various shapes and sizes to meet the size, space and shape restrictions of locations where the assemblies are being installed.

The module assembly can be generally square, round, rectangular, L-shaped or other shapes to work around other underground structures, including but not limited to sewer lines, utilities, fuel storage tanks, water mains and others. The tesselating process and resulting mosaic and layered assembly provides greatly improved strength at increased depths when compared to currently available technologies and thus overcomes limitations with lateral soil pressures which increase proportionately to the depth below the ground surface.

Tesselated modules and resulting mosaic and layered assemblies can be installed at various depths and at various module heights. The top of the top module can be flush with the ground surface and placed in parking lots, landscape areas, sidewalks, airports, ports and streets and can be designed to handle site specific loading conditions such as parkway, indirect traffic, direct traffic and others. The module and assembly can also be placed deeper underground with the top of the top module being from a few inches to several dozen feet below finish surface due to its high strength design. The height of the individual modules or resulting assembled two-piece module can be from a few feet to over a few dozen feet in height.

The tesselated modules and mosaic and layered assembly will allow this system, used for storage of fluids, to be installed deeper underground and be able to handle increased pressure and soil loads due to its shape without need to increase the wall thickness of the modules or increase the amount of rebar reinforcing therefore decreasing material and overall cost of deep installations. This is a major benefit over existing technologies or methods.

In certain embodiments of the present technology, the absence of interior walls in the design of the interior module and the way modules join together with up to one module being in direct fluid communication with three other modules promotes unrestricted water flow between modules in all directions. This results in a more hydraulically efficient system and allows for fluid to evenly disburse through the assembly and minimize drag, velocities within the system, head loss and in turn enhance the system's ability to capture pollutants contained within the incoming storm water runoff, especially pollutants such as trash, sediment and TSS which are more easily removed when velocities are reduced via settling.

Figure 10:
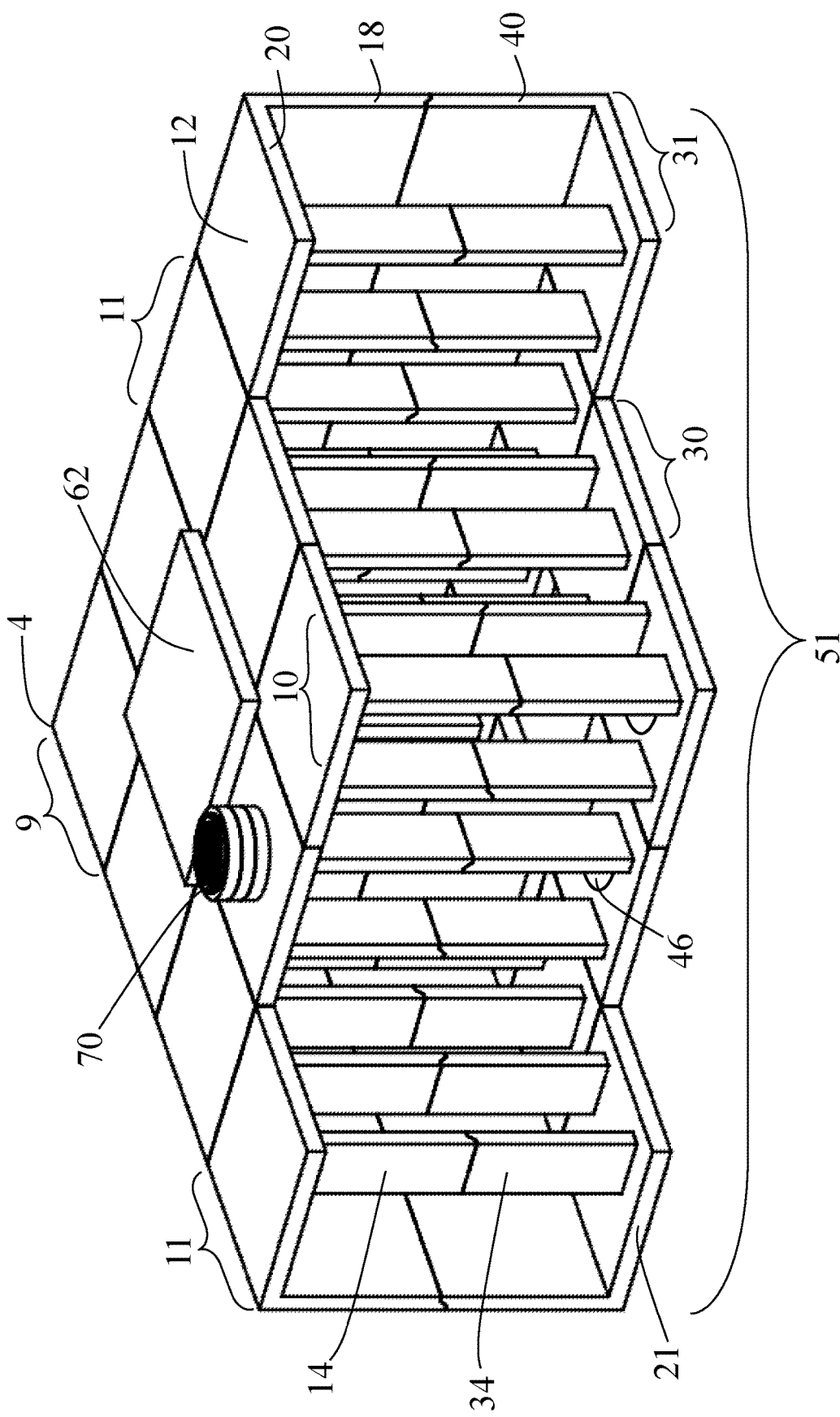
FIG. 10 illustrates a perspective view of tesselated and layered top and bottom modules, in accordance with one embodiment.

In another embodiment, drainage holes at the bottom of a module allow storm water to fully drain out to the floor preventing standing water. FIG. 10 illustrates one embodiment of a single drain hole 46; however, a module may contain zero to many drainage holes 46 placed in the floor 32 of the bottom module floor 30 (best seen in FIG. 2) when infiltration of water back into the native soil below the complete storage assembly system 100 is desired, see FIG. 23 as an example. These drainage holes allow water to exit the system evenly throughout every internal bottom module 30. To connect the complete storage assembly system 100, both inflow pipes 80 and outflow pipes 82 as in FIG. 16 can be connected to the complete storage assembly system 100 through any of the module side walls 18 and 40 as depicted in FIG. 17.

In accordance with certain embodiments, modifications of side walls 66 (FIGS. 12 and 29) in specific chambers can also be made near inflow points to act as pre-treatment settling chambers and isolate incoming sediments and other pollutants.

In some embodiments, specific chambers near outlet points can be modified to include treatment devices or methods such as media filters, membrane filters, biofilters to further treat storm water runoff before leaving the system.

In accordance with alternate embodiments, internal modules may be assembled as a top modular assembly only or a top and bottom modular assembly combination. Further, internal modules may have configurations of three legs, one leg and one side wall, or two legs and one side wall.

In accordance with alternate embodiments, perimeter modules of the complete storage assembly 100 may have configurations of one leg and one wall, one leg and two walls, two legs and one wall, or zero legs and three walls.

Figure 1:
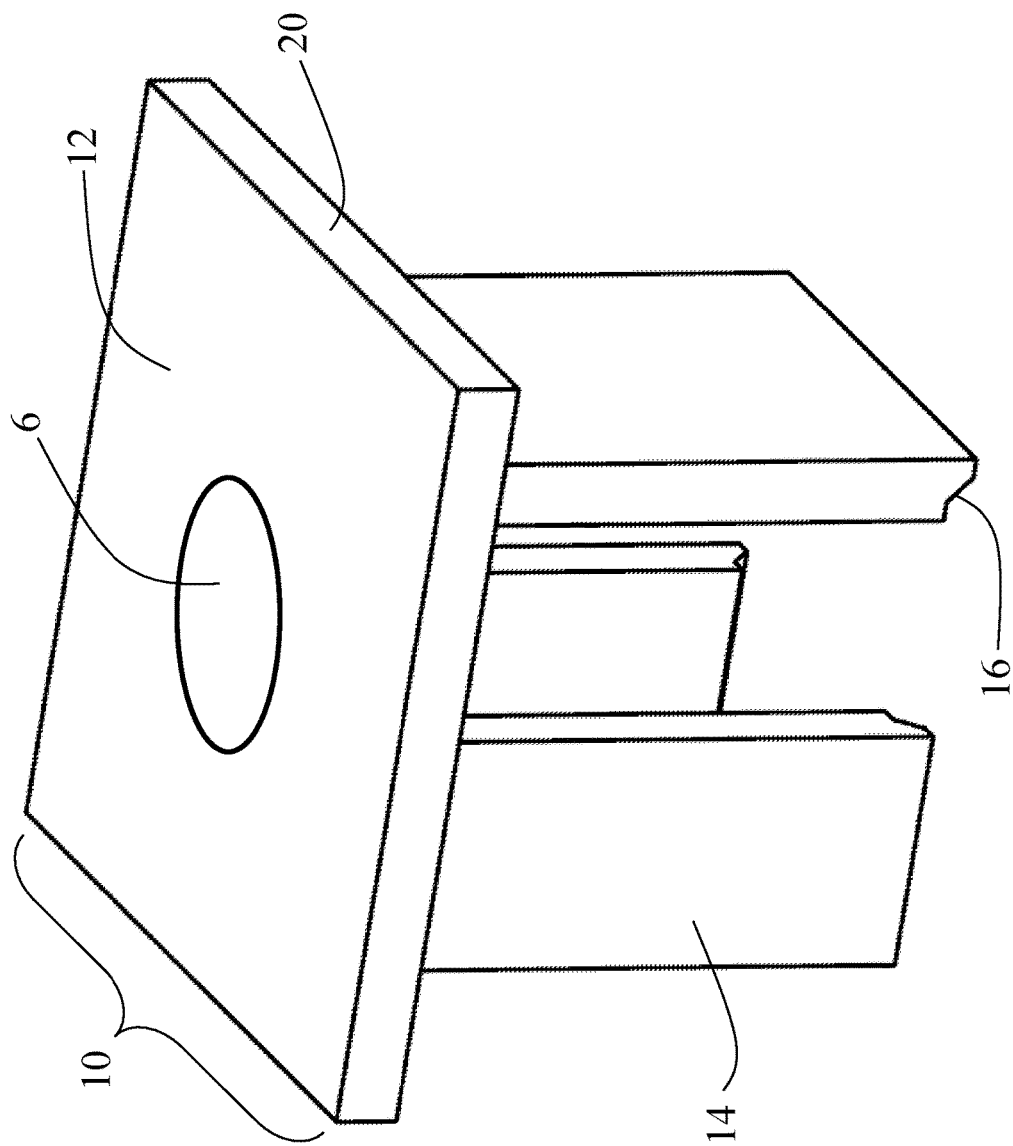
FIG. 1 illustrates a perspective view of the internal top module with three legs, in accordance with one embodiment.
Figure 9:
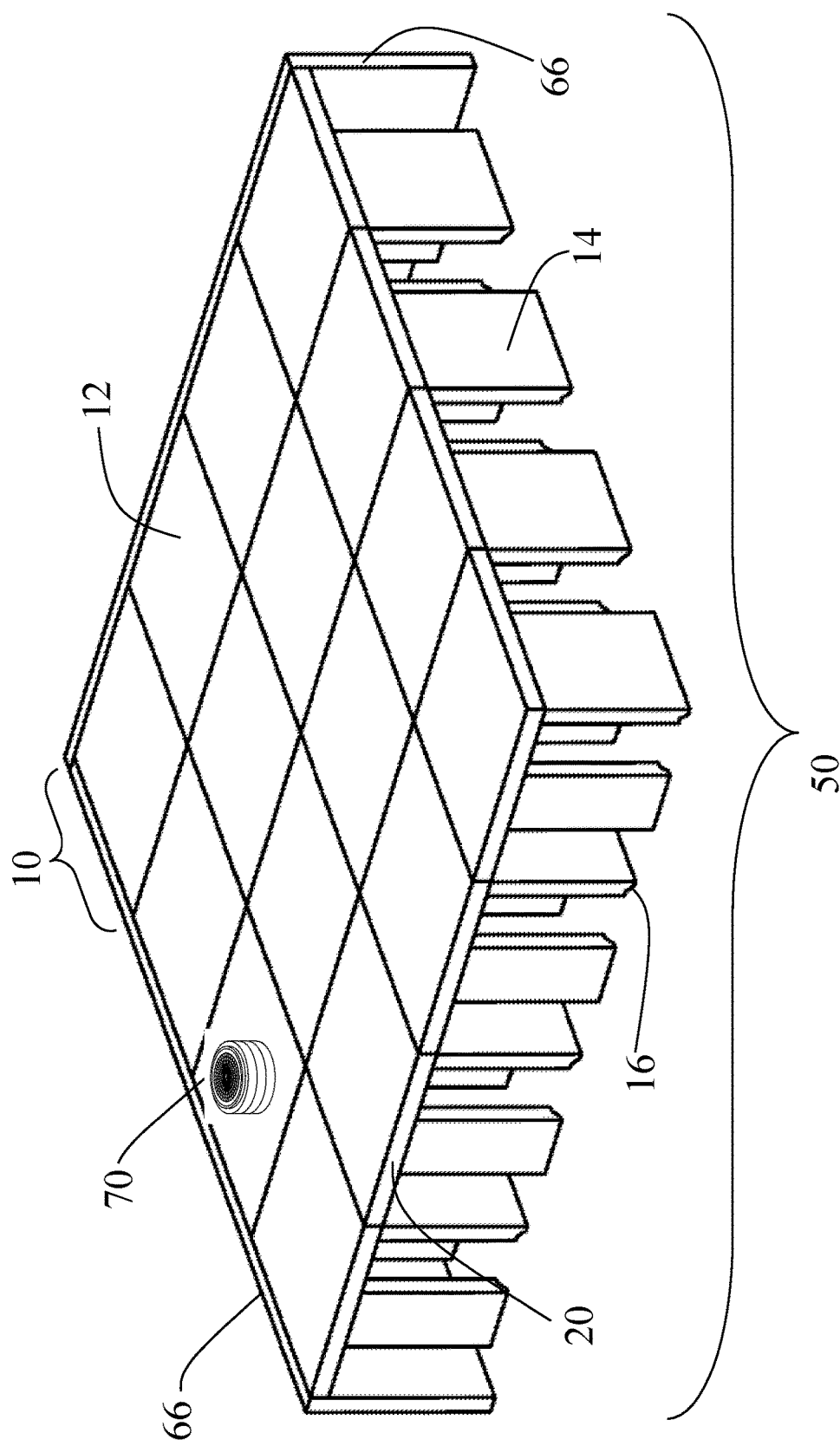
FIG. 9 illustrates a perspective view of the assembled top tessellated internal modules and separate walls, in accordance with one embodiment.

In the preferred embodiment, an interior module assembly fits within an external module assembly. FIG. 1 begins to illustrate an example of a tesselated module of the complete storage assembly 100 (not shown) with a square internal top module 10 designed to collect and store water underground and is maintainable through the access hole 6. The top module is composed of a square shaped top 12 and, in this embodiment, three legs 14. The top module top 12 also has a top module side edge 20 and the legs 14 have a top module bottom of leg 16. The full tesselated module assembly of FIG. 1 and FIG. 9 represent one embodiment of an unstacked top module used in more shallow, underground cavities wherein the assembled top module may be placed directly on a foundation or compacted rock backfill rather than being assembled to a bottom tesselated module assembly. Similarly, an alternate embodiment as demonstrated in FIG. 32 wherein the overall shape of the internal top module is rectangular 160 may be installed unstacked in more shallow, underground cavities.

Figure 2:
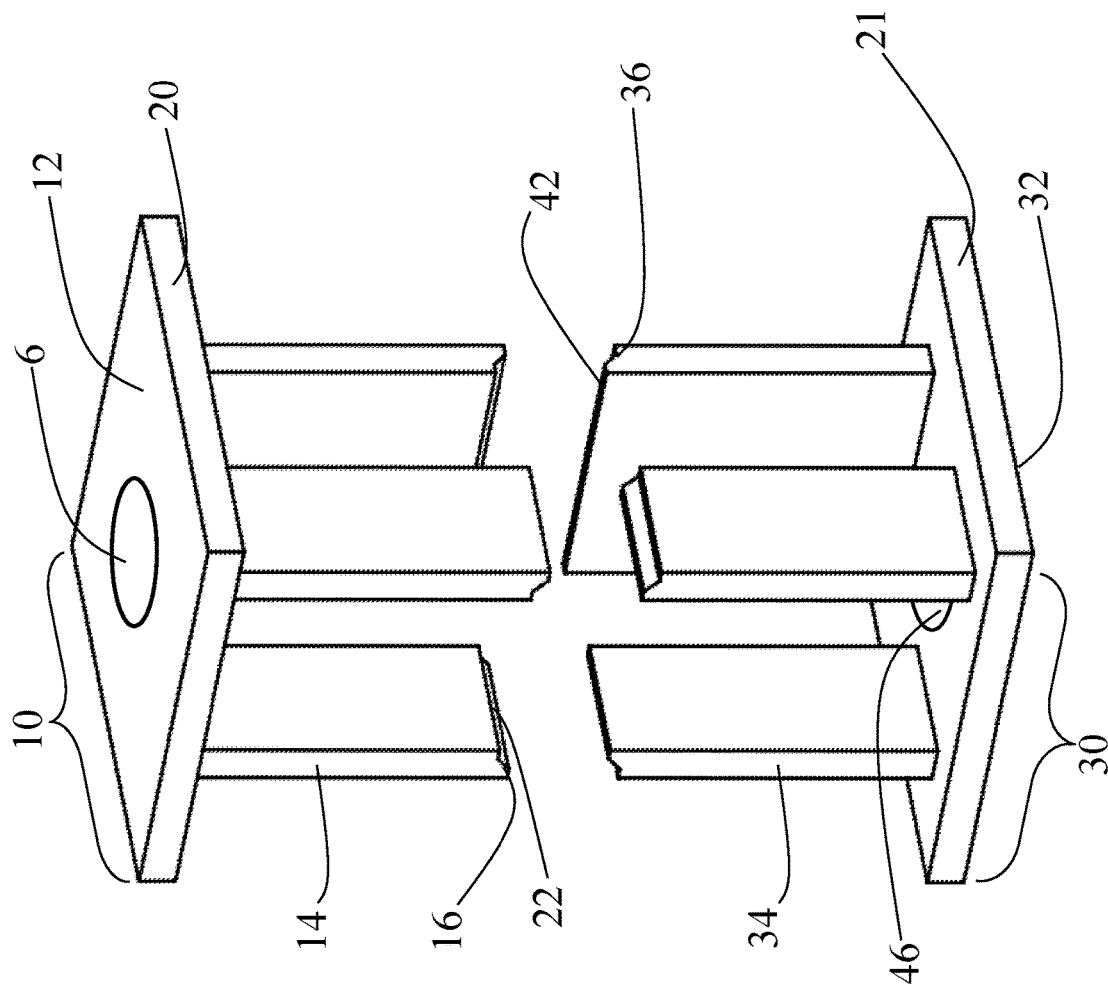
FIG. 2 illustrates a perspective view of an internal top module with three legs layered with an internal bottom module with three legs, in accordance with one embodiment.

FIG. 2 illustrates the internal square top module shown in FIG. 1 in position for assembly with a mirrored internal bottom module 30. The squared internal top module 10 has top module top 12 with a top module side edge 20 and an access hole 6. This particular embodiment configuration includes three top module legs 14 with three top module bottom of legs 16 and top module male ship lap joints 22. The internal bottom module 30 has a bottom module floor 32 with a drainage hole 46 and a bottom module side edge 21. The internal bottom module 30 also has three bottom module legs 34, each with a bottom module top of leg 36 and a bottom module female ship lap joint 42.

Figure 3:
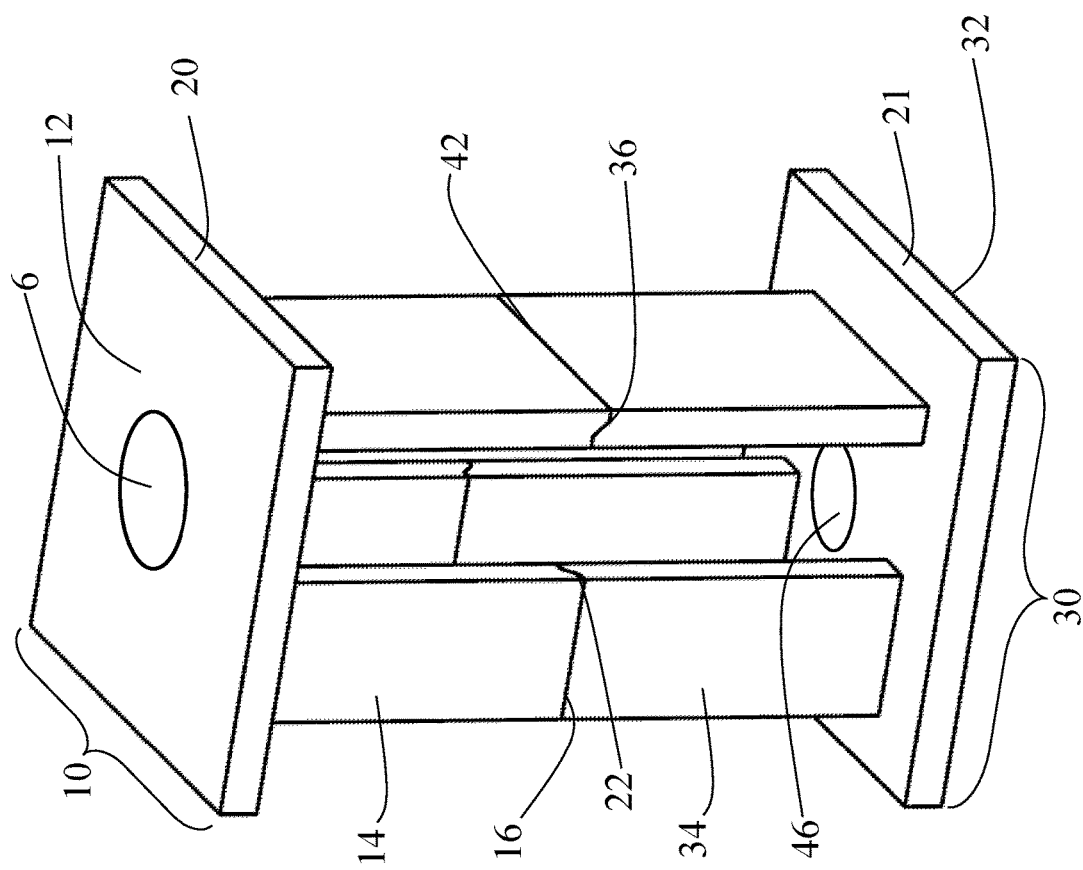
FIG. 3 illustrates a perspective view of an example of the assembly of internal top and bottom module, in accordance with one embodiment.

FIG. 3 demonstrates layered internal top and bottom modules assembled together. Water moves through the access hole 6 of the internal top module 10 through the channel-less areas between the assembled legs and out the drainage hole 46, in accordance with one embodiment. The co-joined internal top module 10 illustrates the elements, including: a squared top module top 12 with a top module side edge 20, and three top module legs 14 each with top module bottom of the leg 16 and a top module male ship lap joint 22. The internal bottom module 30 of this embodiment also includes a squared bottom modular floor 32 and a bottom module side edge 21 with three bottom module legs 34, each with a bottom module top of leg 36 with a bottom module female ship lap joint 42.

Figure 4:
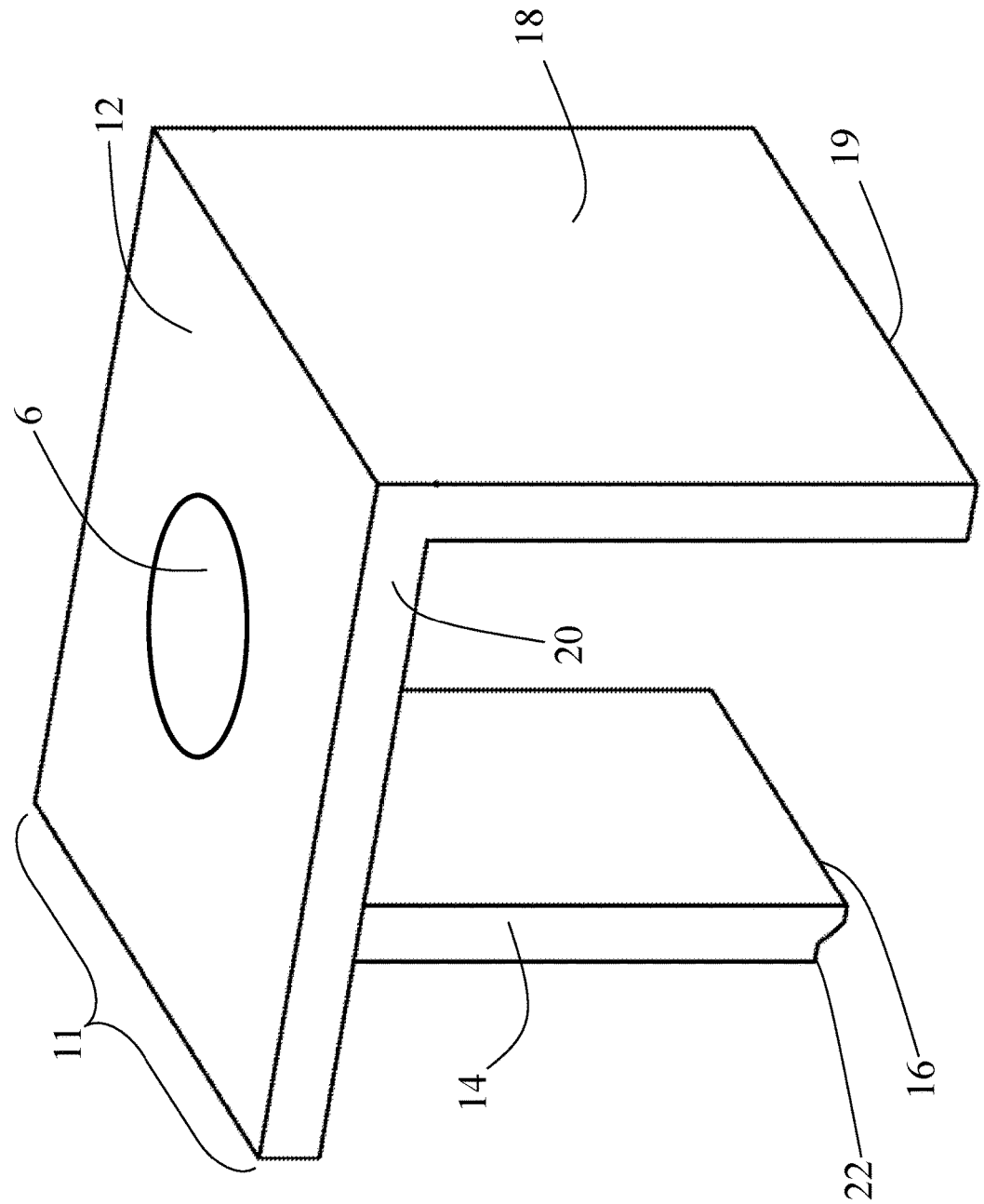
FIG. 4 illustrates a perspective view of a perimeter module with one leg and one wall, in accordance with one embodiment.
Figure 30:
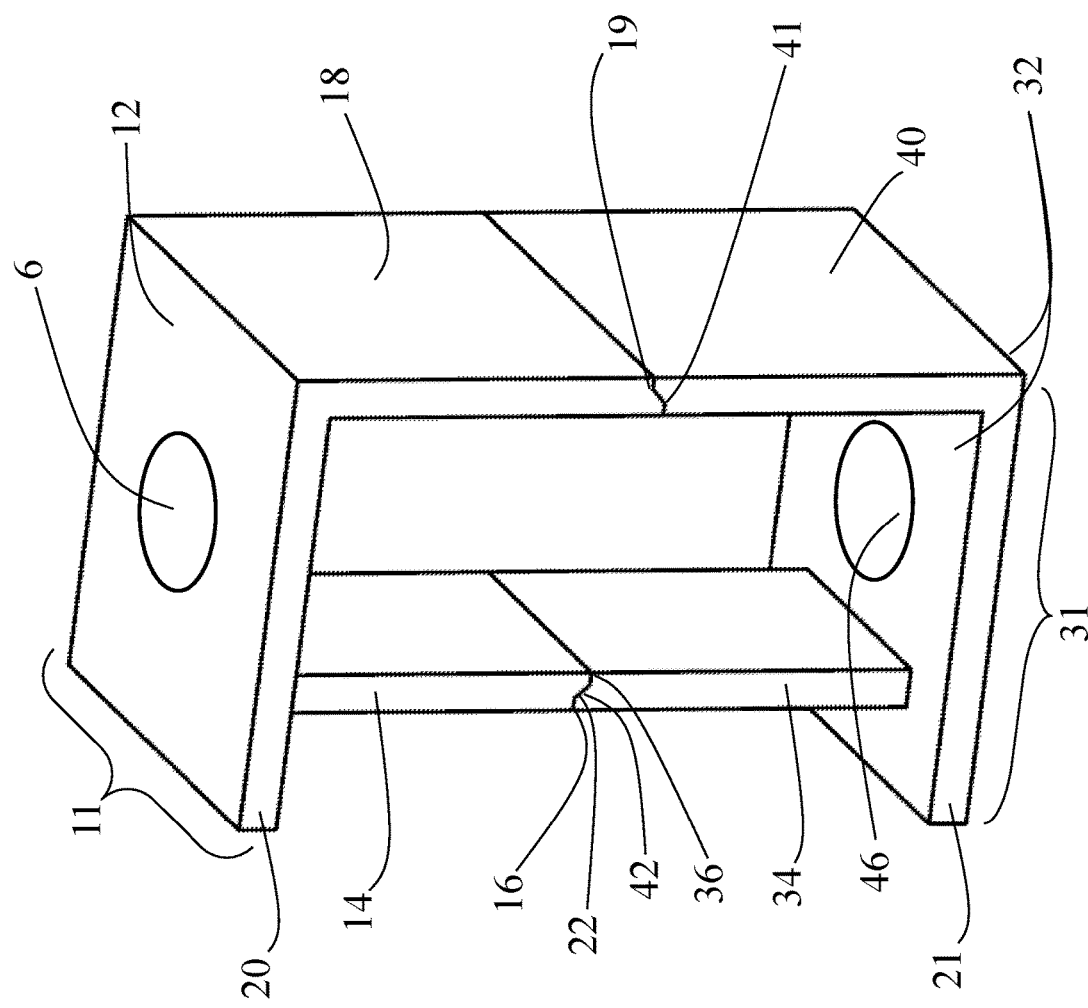
FIG. 30 illustrates a perspective view of the assembly of perimeter top and bottom module, each having one leg and one wall, in accordance with one embodiment.

The illustrated embodiment of FIG. 4 demonstrates a configuration of a perimeter top module 11 with an access hole 6 as seen in an internal top module 10 (not shown). While a perimeter module may have a combination of walls and legs, as seen in FIG. 4, the perimeter top module 11 has one top module side wall 18 with a top module bottom of wall 19 and a top module side edge 20. Additionally, it has one top module leg 14 with a top module bottom of wall 16 and a top module male ship lap joint 22. The perimeter top module 11 with one top module side wall 18 and one top module leg 14 may be layered with a mirrored bottom perimeter module 31 as seen in FIG. 30.

Figure 5:
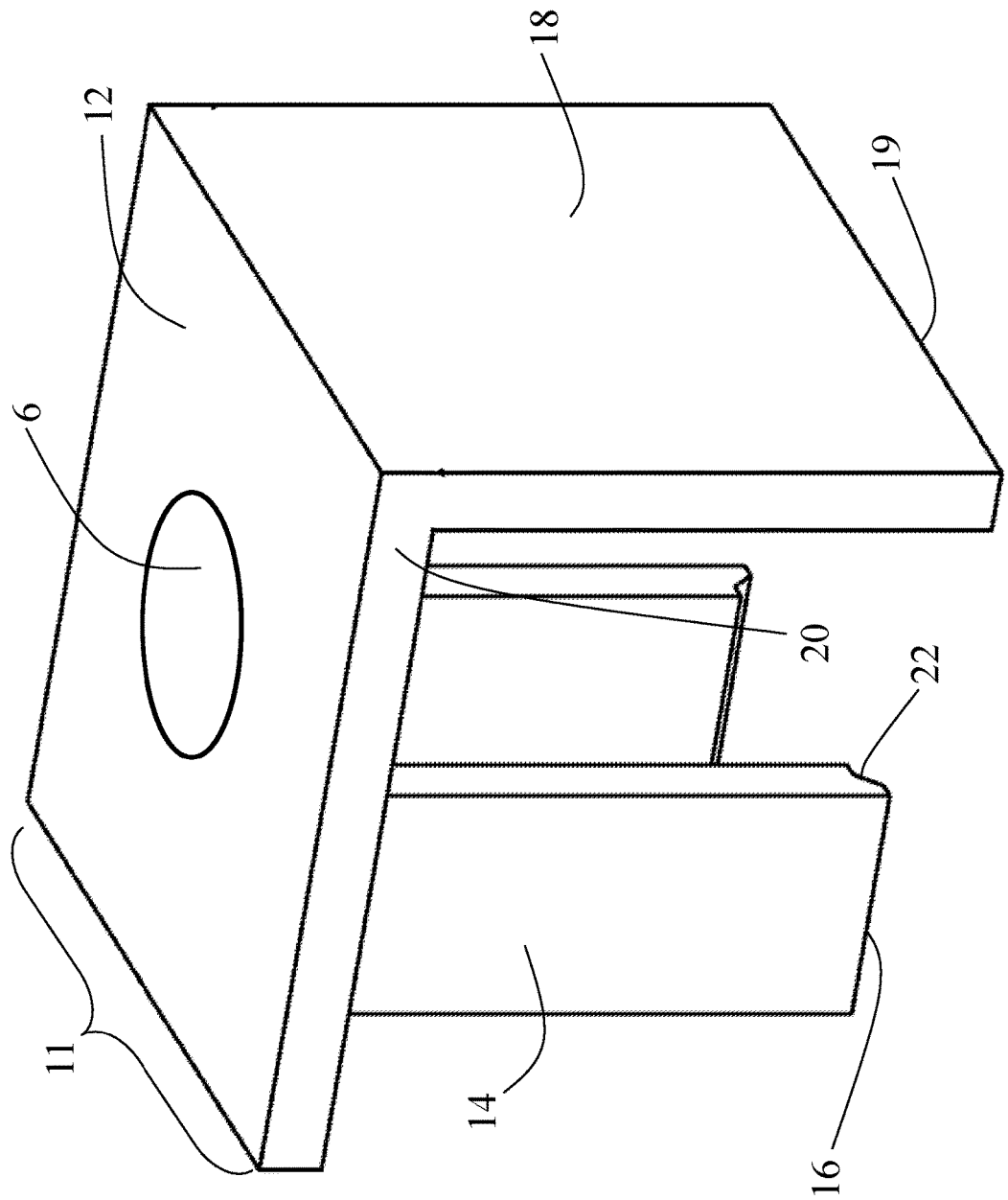
FIG. 5 illustrates a perspective view of a perimeter module with two legs and one wall, in accordance with one embodiment.

An alternative configuration of a perimeter module is presented in FIG. 5 wherein the perimeter top module 11 with an access hole 6 has a combination of one top module side wall 18 with a top module bottom of wall 19 and a top module side edge 20 and two top modular legs 14. The perimeter top module 11 has one top module side wall 18 with a top module bottom of wall 19 and a top module side edge 21. Additionally, it has one top module leg 14 with a top module bottom of wall 16 and a top module male ship lap joint 22.

Figure 6:
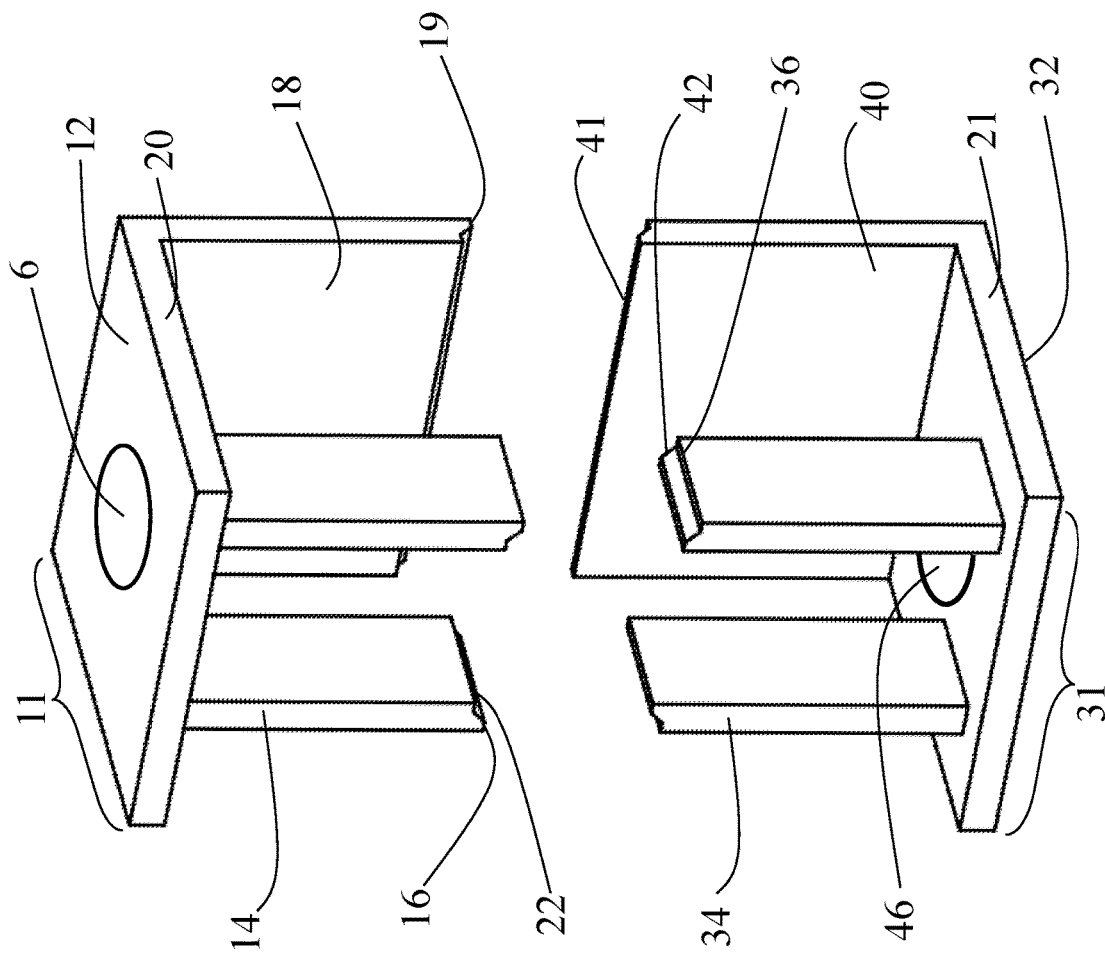
FIG. 6 illustrates a perspective view of a top perimeter module with two legs and one wall layered with a bottom perimeter module with two legs and one wall, in accordance with one embodiment.

The embodiment of FIG. 6 illustrates both top and a bottom perimeter modules. The perimeter top module 11 has two top module legs 14 and one top module side wall 18. The top module side wall 18 has a top module bottom of wall 19 and a top module side edge 20. The perimeter top module also has an access hole 6. The legs each have a top module bottom of leg 16 and a top module male ship lap joint 22. The perimeter bottom module 31 also has a wall and two legs and a bottom module floor 32 with a drainage hole 46. The perimeter bottom module side wall 40 has a bottom module side edge 21 and a bottom module top of wall 41. The two bottom module legs 34 each have bottom module top of leg 36 and bottom module female ship lap joints 42.

Figure 7:
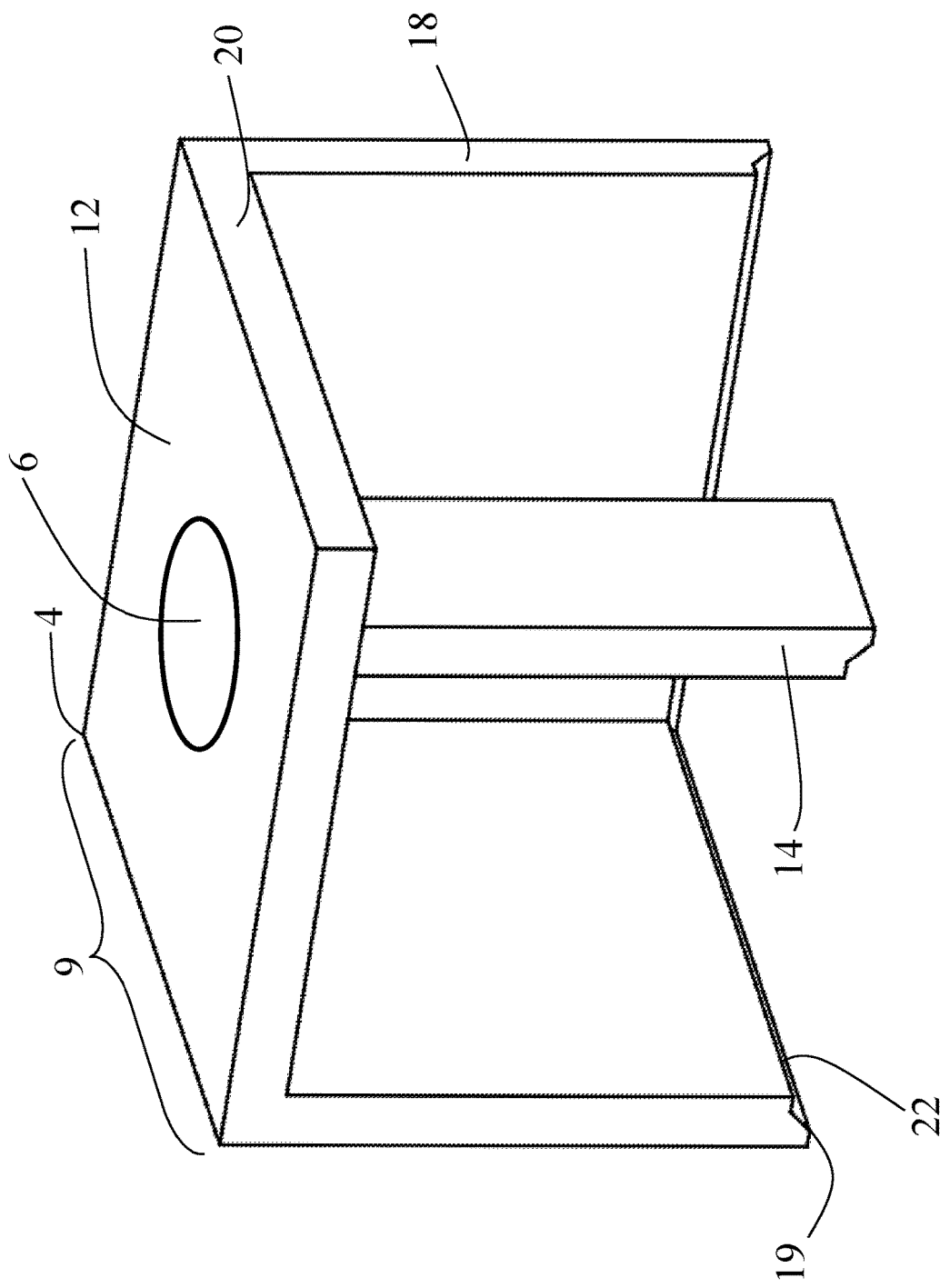
FIG. 7 illustrates a perspective view of a perimeter top module with one leg and two walls, in accordance with one embodiment.

FIG. 7 presents an embodiment of a perimeter corner top module 9 depicting two side walls 18 and one top module leg 14. The top module top 12 of the perimeter corner top module 9 has an access hole 6 and a top module side edge 20. Attached to the top module top 12 are two top module side walls 18, each having a top module bottom of wall 19 and a top module male ship lap joint 22.

Figure 8:
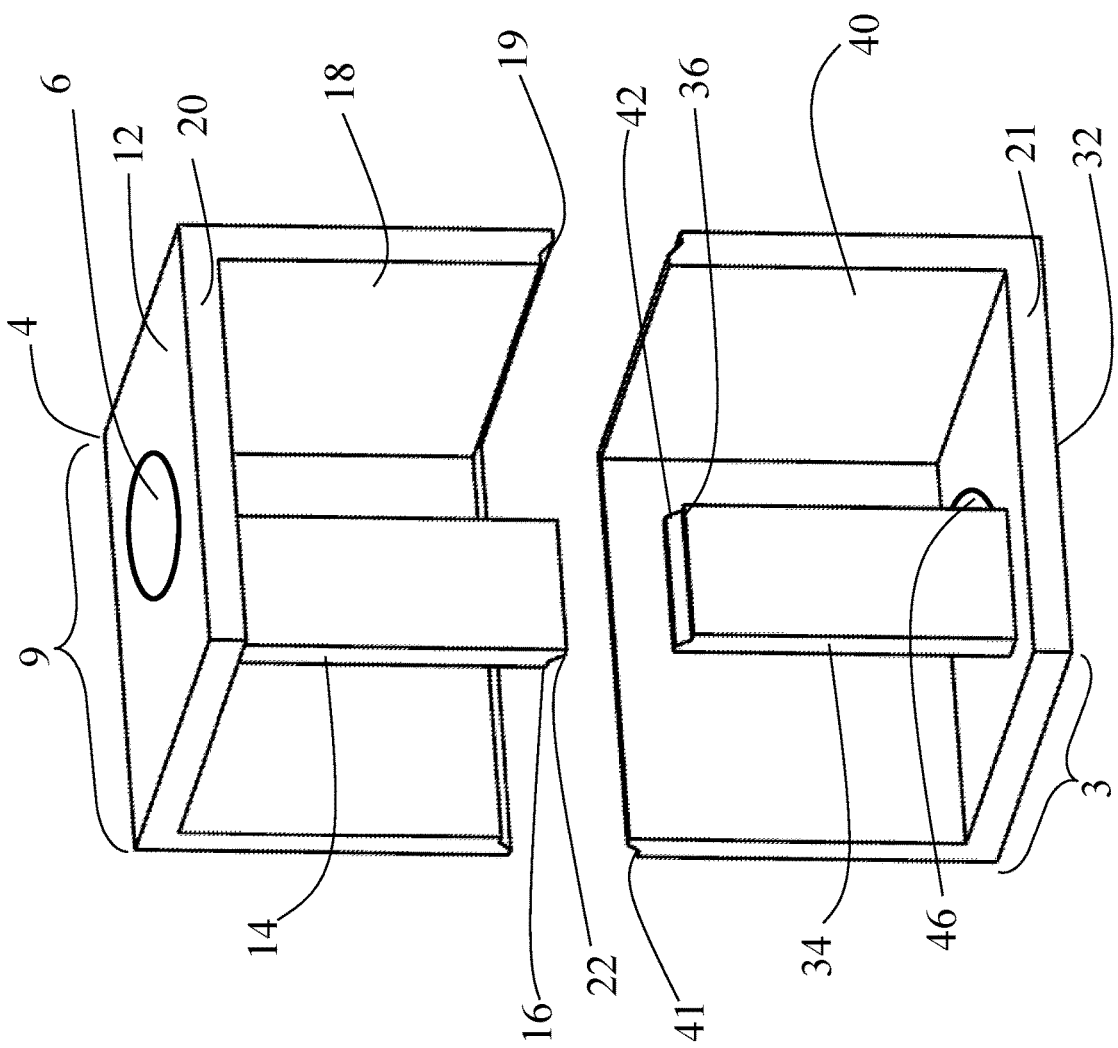
FIG. 8 illustrates a perspective view of a perimeter top module with one leg and two walls layered with a perimeter bottom module with one leg and two walls, in accordance with one embodiment.

FIG. 8 illustrates a perimeter corner top module 9 mirrored with a corresponding perimeter corner bottom module 3. Similar to FIG. 7, the perimeter corner top module 9 has two side walls 18 and one top module leg 14. The top module top 12 of the perimeter corner top module 9 has an access hole 6 and a top module side edge 20. Attached to the top module top 12 are two top module side walls 18, each having a top module bottom of wall 19 and a top module male ship lap joint 22. The singular top modular leg 14 has a top module bottom of leg 16 and a top module male ship lap joint 22.

Also in FIG. 8, the perimeter corner bottom module 3 includes two bottom module top of walls 41 for each bottom module side wall 40, two bottom module side edges 21, and a bottom module floor 32 with a drainage hole 46. The bottom module leg 34 of the perimeter corner bottom module 3 has a bottom module top of leg 36 and a bottom module female ship lap joint 42.

FIG. 9 demonstrates an assembly 50 of top modules 10 and separate walls 66. The top modules 10 include a top module top 12, an access riser and access hatch assembly 70, side wall panels, and top module side edges 20. The top module legs 14 also illustrate the top module bottom of legs 16.

FIG. 10 represents an embodiment of an assembly 51 of top 10 and bottom modules 30 layered. The top module portion includes perimeter top modules 11 with two top module legs 14, a perimeter corner top module 9, and internal top modules 10, and a perimeter top module 11. Also, part of the top module elements are: an access riser and access hatch assembly 70, a top slab 62, top module tops 12, top module side edges 20, top module side walls 18, perimeter corner top module wall intersection 4, and top module legs 14.

Further, FIG. 10 represents an embodiment of the bottom module portion, including: internal bottom modules 30, perimeter bottom modules 31, bottom module side walls 40, and bottom module side edges 21. Also depicted is a drainage hole 46, and bottom module legs 34.

FIG. 11 illustrates a top view and bottom view of top slab 62 and a top slab notch down 68.

Figure 12:
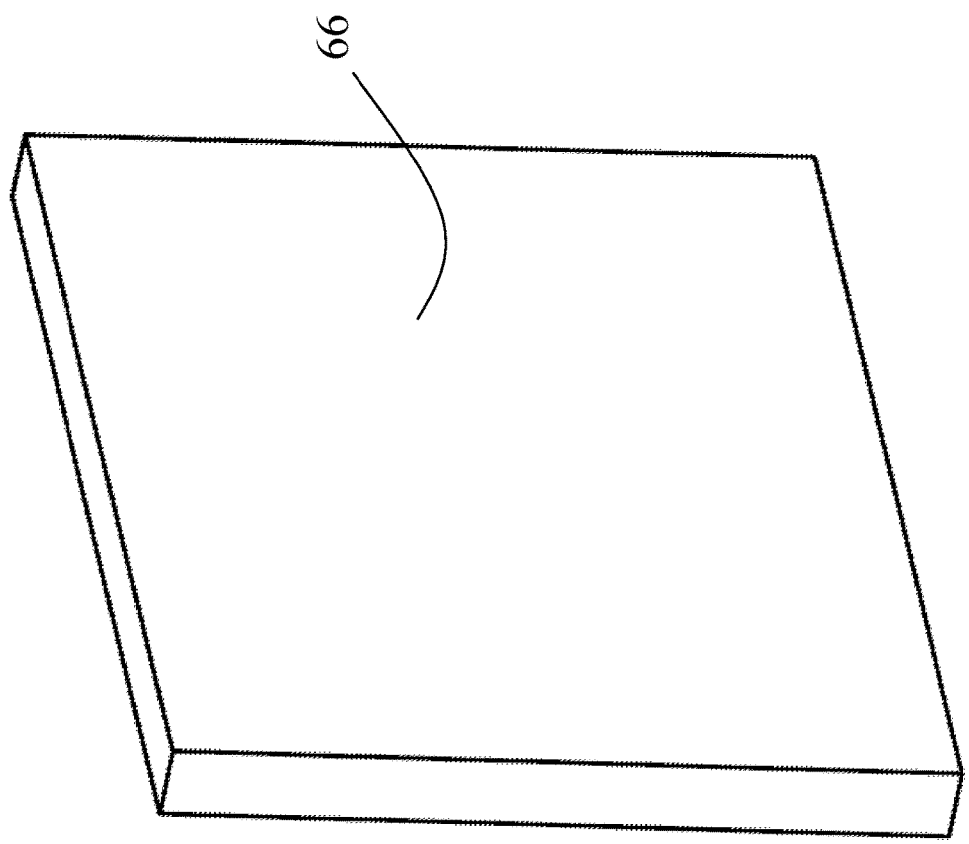
FIG. 12 illustrates a three-dimensional view of side wall panel, in accordance with one embodiment.

FIG. 12 presents a side wall panel 66 which may be included with some embodiments.

Figure 13:
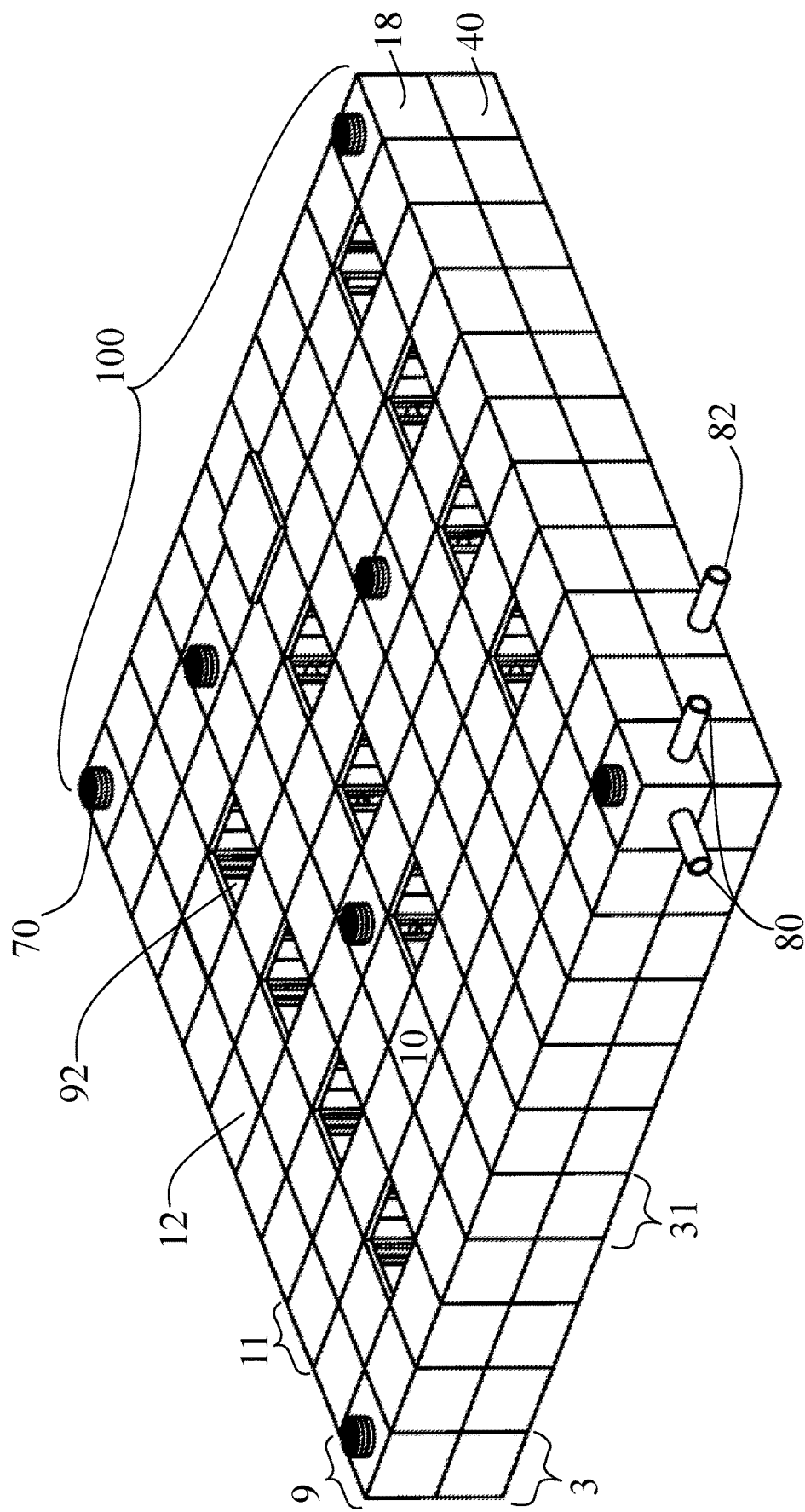
FIG. 13 illustrates a three-dimensional view of a full module assembly storage system, in accordance with one embodiment.

FIG. 13 presents a complete storage system assembly 100 with multiple access risers and access hatch assemblies 70, inflow pipes 80 and an outflow pipe 82. Also shown is a modular assembly internal void area 92. Other elements previously presented include: perimeter top modules 12, perimeter corner top modules 9, perimeter corner bottom modules 3, perimeter bottom modules 31, top module side walls 18, bottom module side walls 40, internal top modules 10 and top module tops 12.

Figure 14:
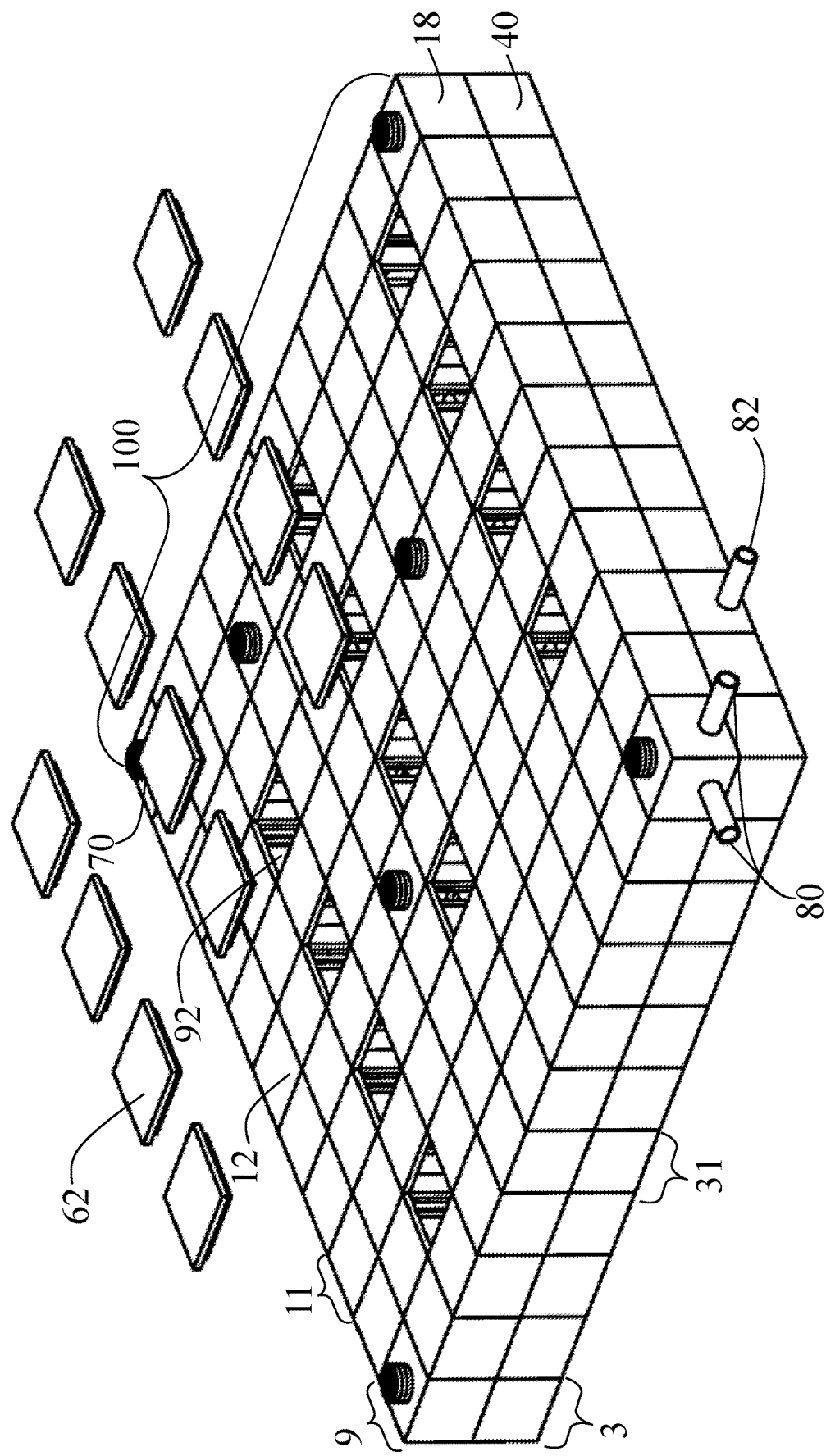
FIG. 14 illustrates three-dimensional view of a complete storage system assembly demonstrating the assembly of top slabs inserted into internal void areas, in accordance with one embodiment.

FIG. 14 demonstrates how top slabs 62 can be inserted in module assembly internal void areas 92. Similar to FIG. 13, other features of an embodiment of the invention include: a complete storage system assembly 100 with multiple access risers and access hatch assemblies 70, inflow pipes 80 and an outflow pipe 82. Also shown is a modular assembly internal void area 92. Other elements previously presented include: perimeter top modules 12, perimeter corner top modules 9, perimeter corner bottom modules 3, perimeter bottom modules 31, top module side walls 18, bottom module side walls 40, internal top modules 10 and top module tops 12.

Figure 15:
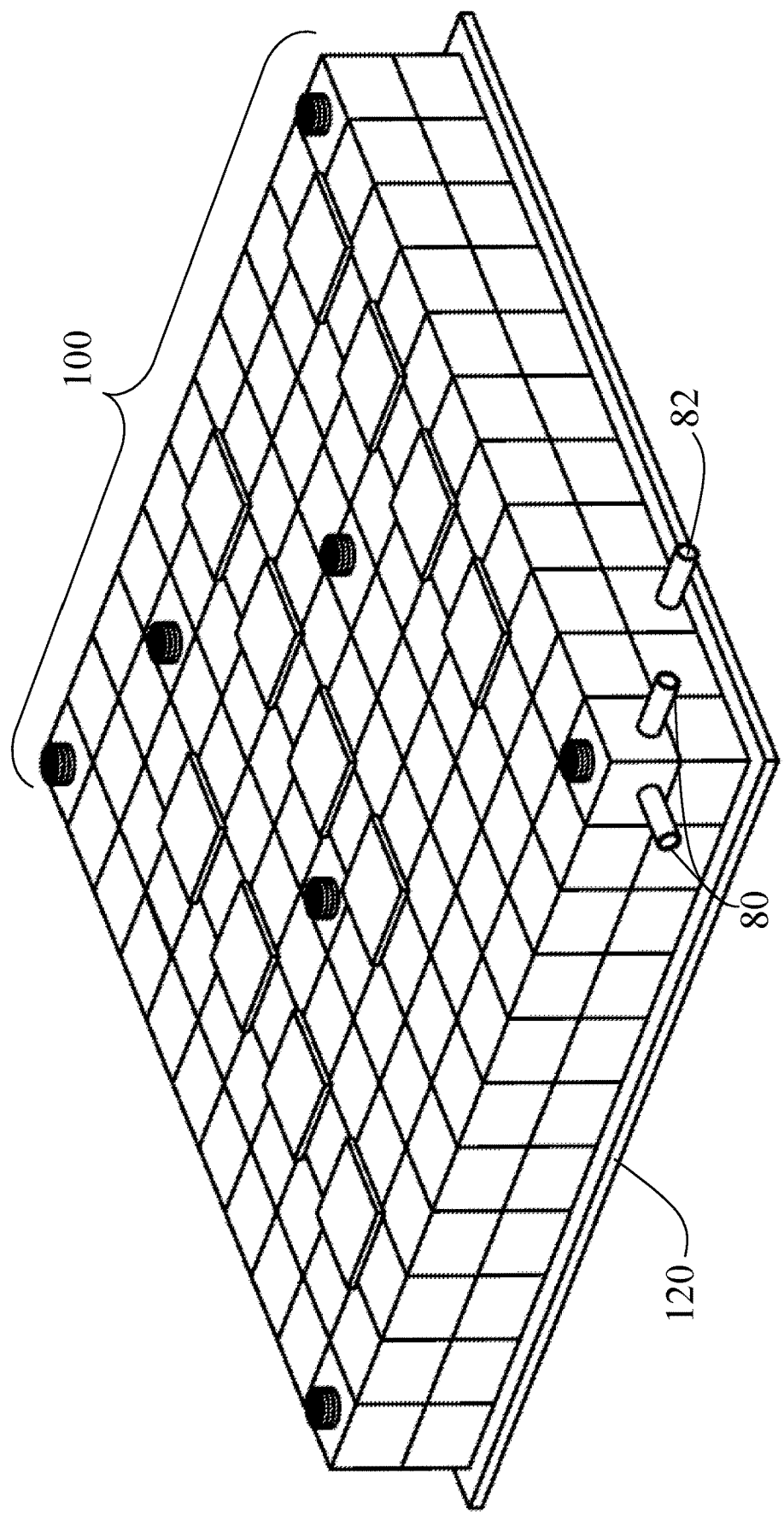
FIG. 15 illustrates a three-dimensional view of a complete storage system assembly on a gravel base, in accordance with one embodiment.

FIG. 15 presents an embodiment of a complete storage system assembly 100 located on top of a gravel base 120.

Figure 16:
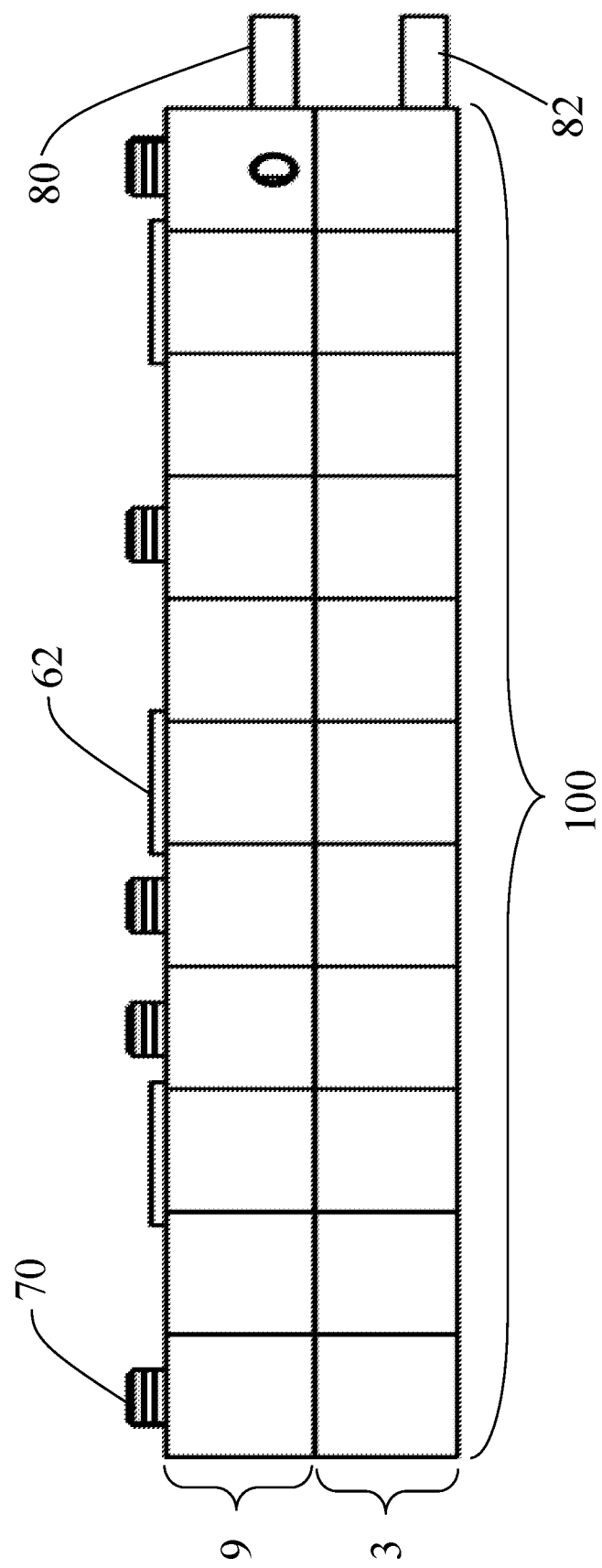
FIG. 16 illustrates a side view of a complete storage system assembly, in accordance with one embodiment.
Figure 17:
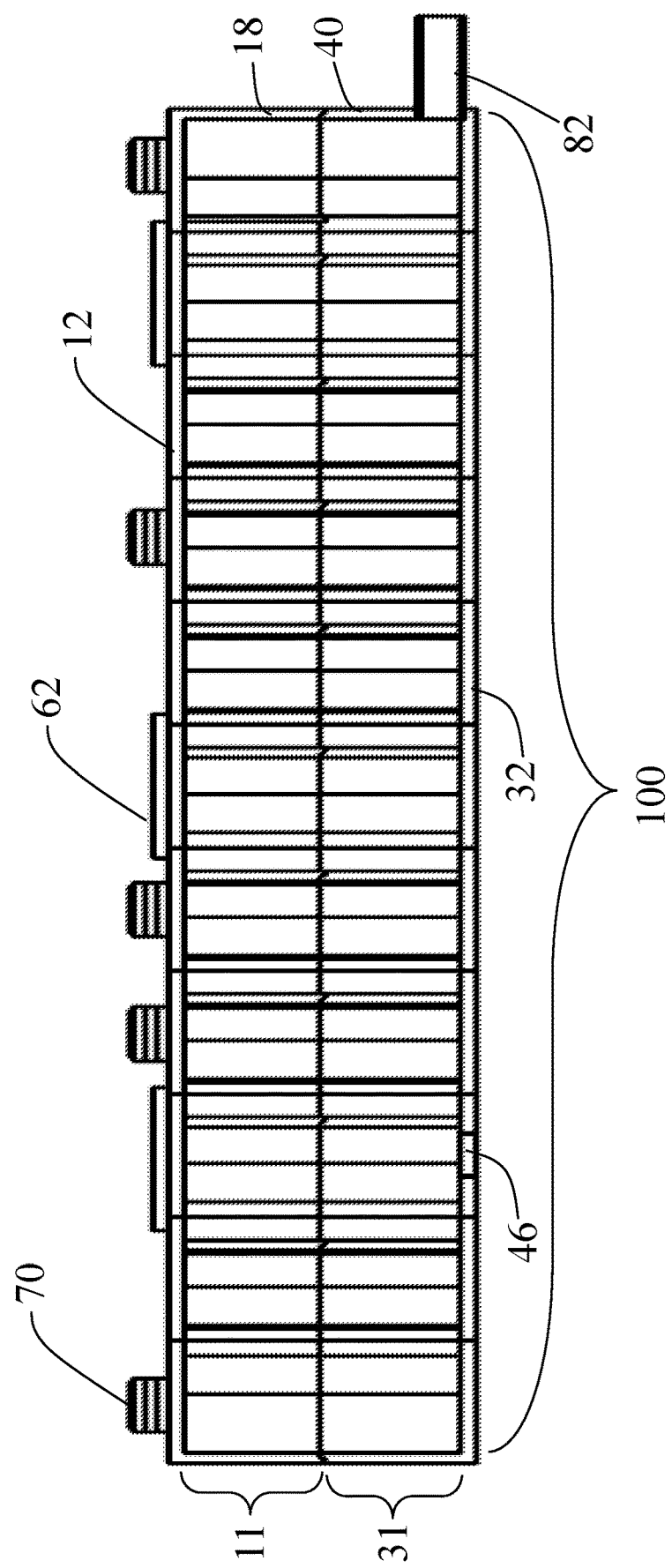
FIG. 17 illustrates a side cut-away view a complete storage system assembly with top slabs and side panels, in accordance with one embodiment.

FIG. 16 presents a side view of a complete storage system assembly 100 with an inflow pipe 80 and an outflow pipe 82, top slabs 62, access risers and access hatch assemblies 70, perimeter corner top modules 9, and perimeter corner bottom modules 3.

FIG. 17 presents a cut-away, side view of a complete storage system assembly 100 with an outflow pipe 82, top slabs 62, access risers and access hatch assemblies 70, top module tops 12, perimeter top modules 11, perimeter bottom modules 31, top module side walls 18, bottom module side walls 40, and bottom module floors 32.

Figure 18:
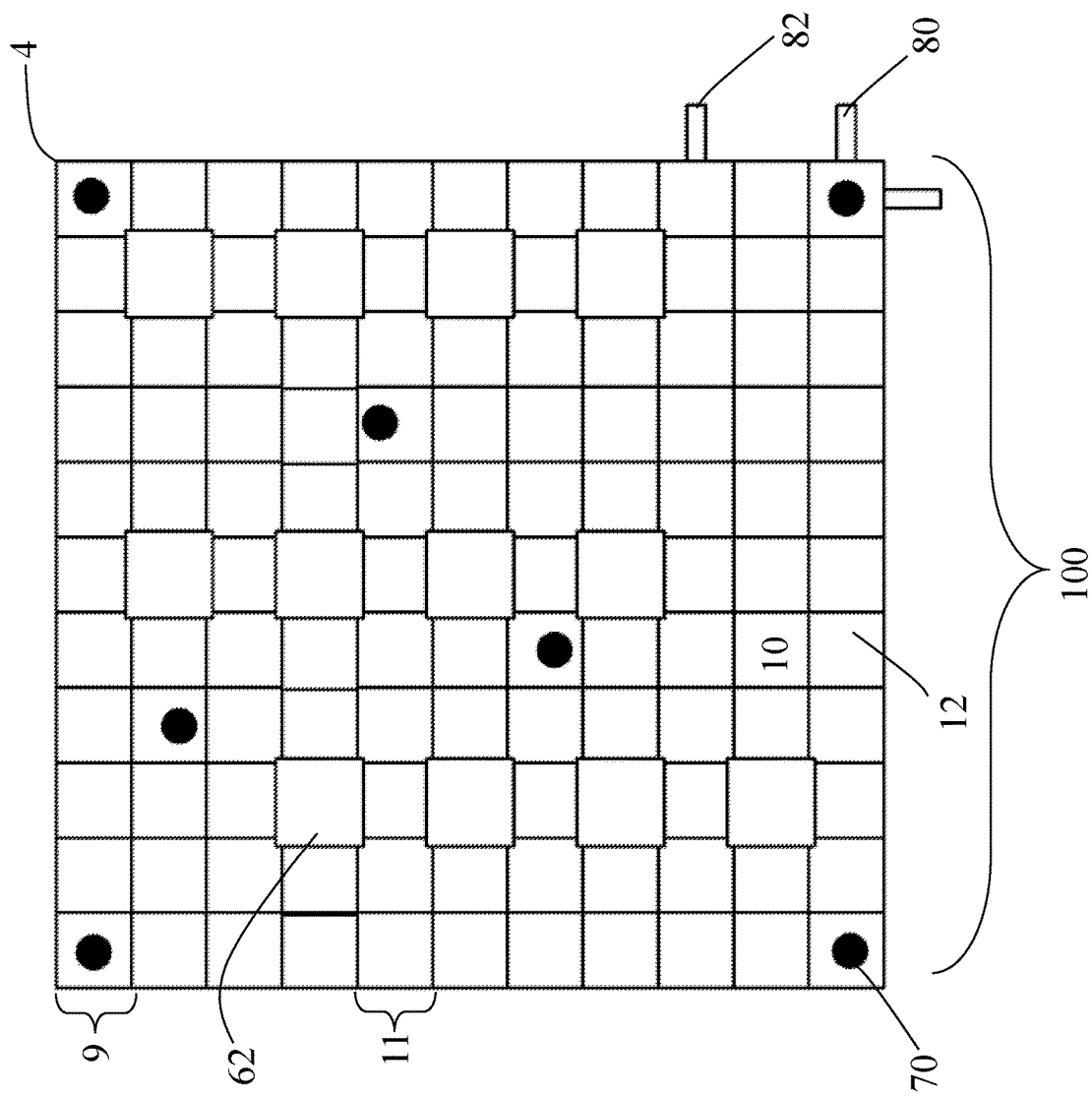
FIG. 18 illustrates top view of a full module assembly storage system, in accordance with one embodiment.

FIG. 18 presents a top view of one embodiment of complete storage system assembly 100 with an inflow pipe 80 and an outflow pipe 82, top slabs 62, access risers and access hatch assemblies, 70, top module tops 12, perimeter top modules 11, perimeter corner top modules 9, internal top modules 10 and perimeter corner top modules 4.

Figure 19:
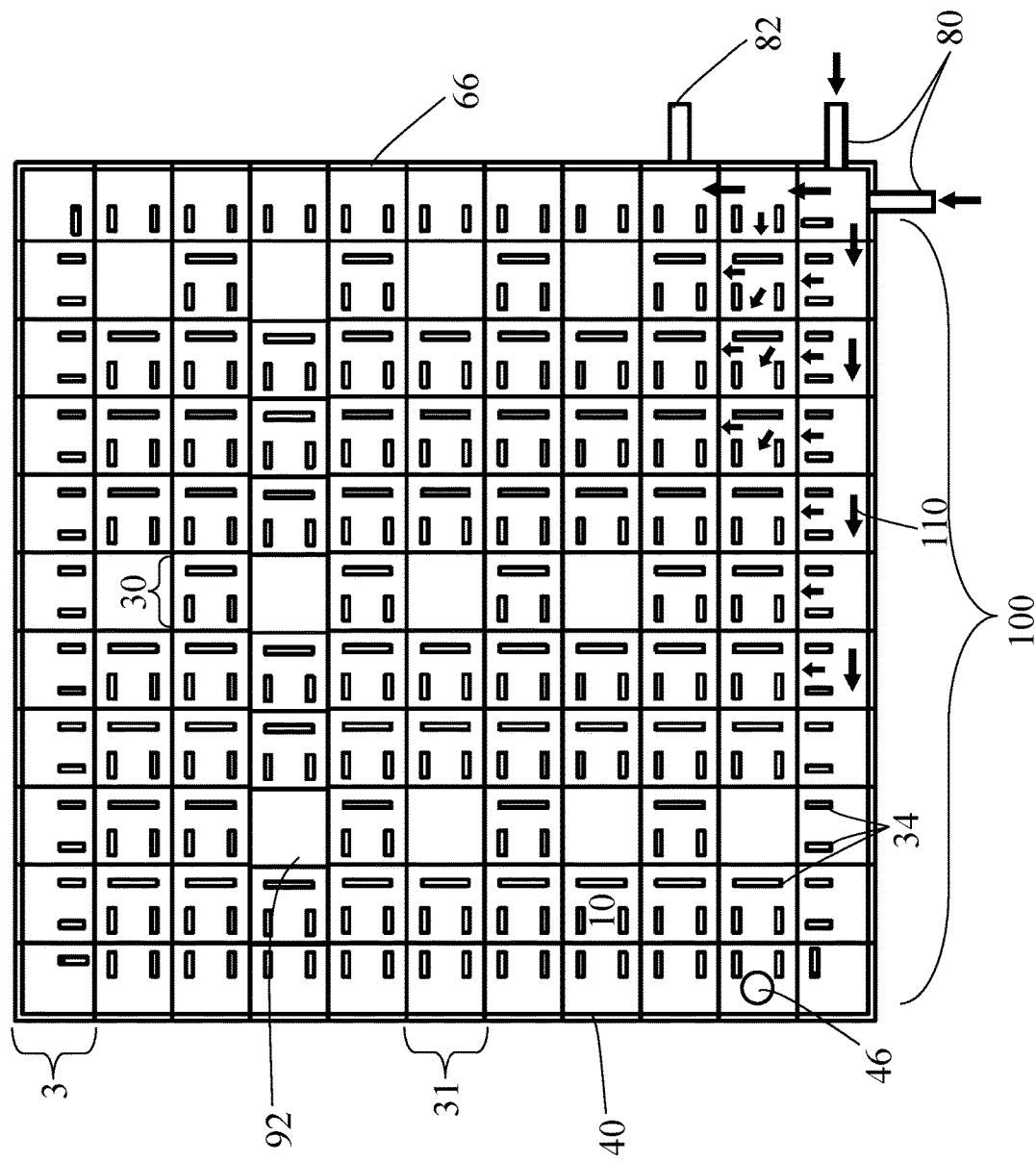
FIG. 19 illustrates a cut-away, top view of full module assembly storage system, in accordance with one embodiment.

FIG. 19 illustrates a cut-away, top view of full module assembly storage system complete storage system assembly 100 with an inflow pipe 80 and an outflow pipe 82 with multi-direction flow path of water 110. Also included are elements included in previous figures, including: perimeter corner bottom modules 3, perimeter bottom modules 31, internal bottom modules 30, module assembly internal void areas 92, bottom module side walls 40, bottom module legs 34, internal top modules 10 and a drainage hole 46.

Figure 20:
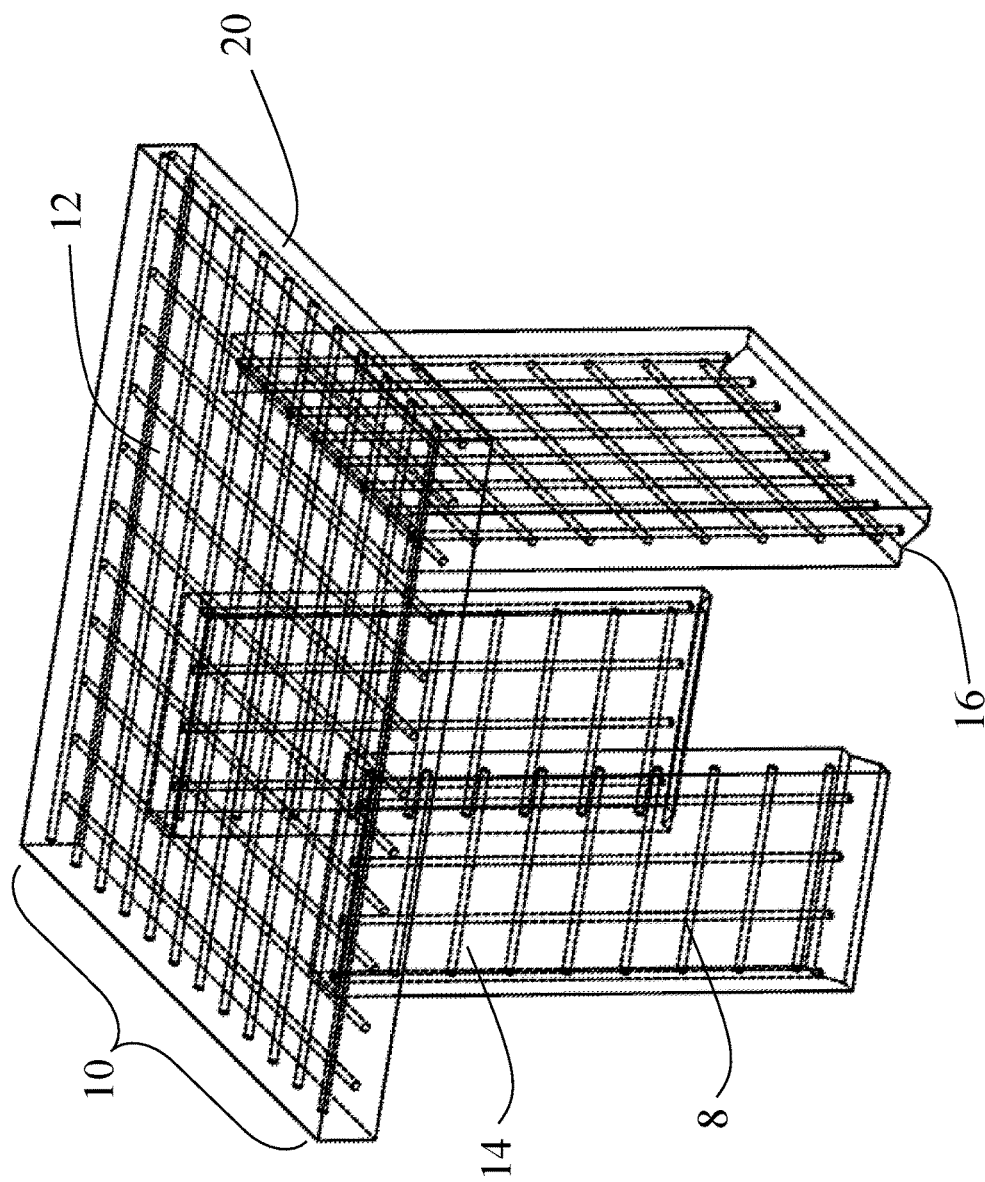
FIG. 20 illustrates a three-dimensional and transparent view of an internal top module with three legs, showing internal rebar, in accordance with one embodiment.

FIG. 20 illustrates a perspective view of FIG. 1 with an internal rebar reinforcement 8 in the internal top module 10. Also presented are three top module legs 14 and top module bottoms of legs 16, and a top module top 12 and top module side edges 20.

Figure 21:
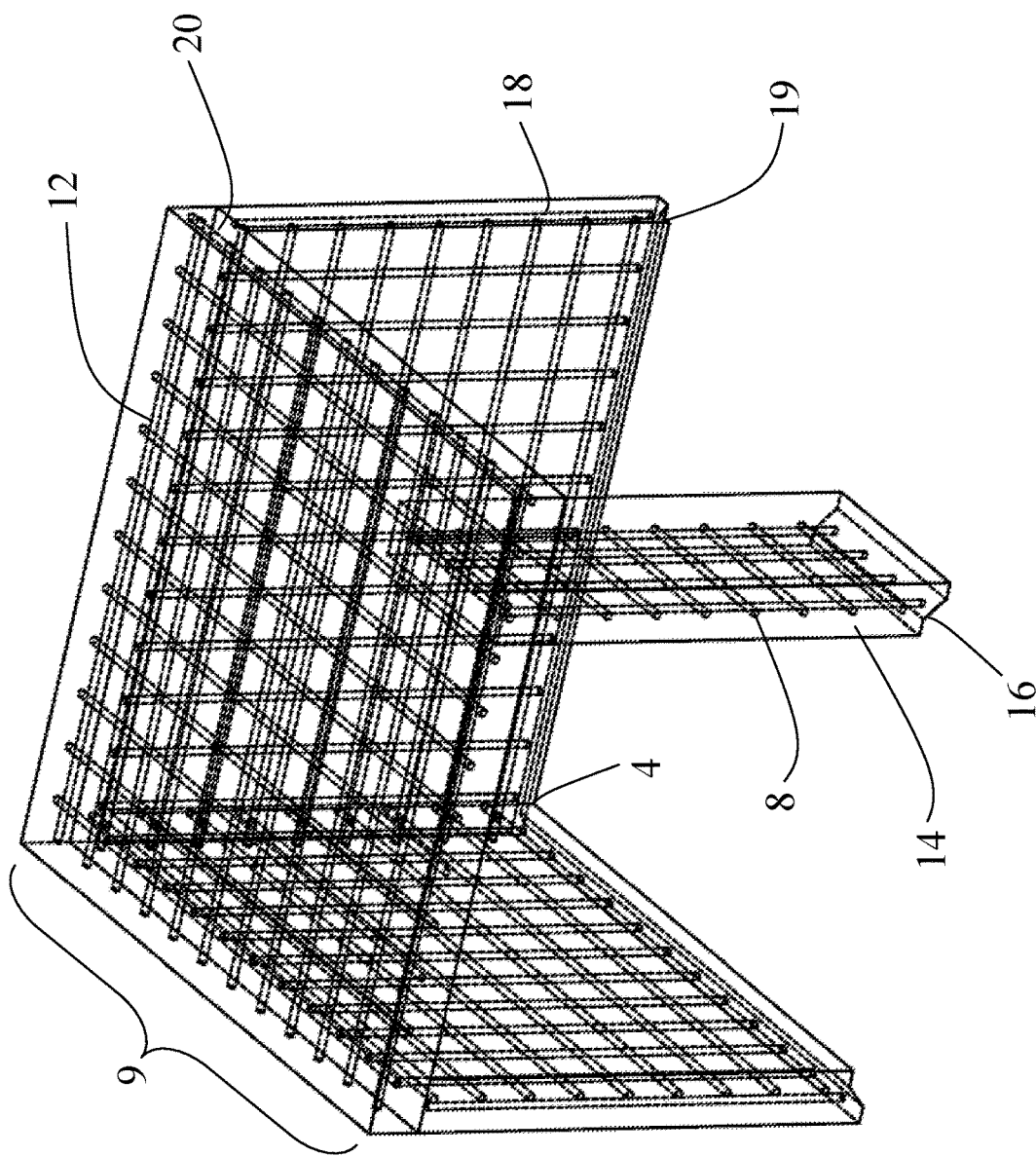
FIG. 21 illustrates a three-dimensional and transparent view of a perimeter corner top module with one leg, showing internal rebar in accordance with one embodiment.

FIG. 21 illustrates a perspective view of FIG. 7 with an internal rebar reinforcement 8 in a perimeter corner top module 9. Also presented is a top module top 12, top module side edges 20, top module side walls 18, top module bottom of walls 19, a perimeter corner top module wall intersection 4, and one top module leg 14 with a top module bottom of leg 16.

Figure 22:
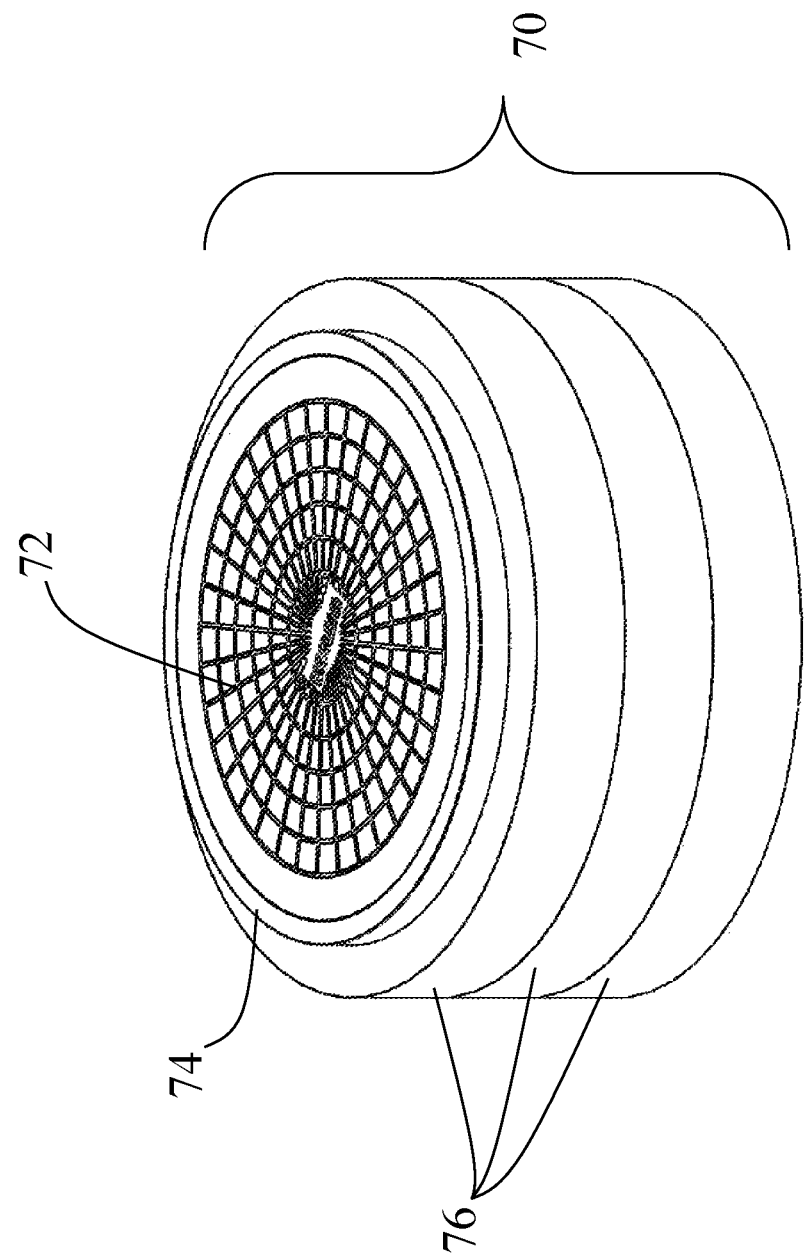
FIG. 22 illustrates an external perspective view of an access riser and access hatch assembly 70, in accordance with one embodiment.

FIG. 22 presents a detailed view of an access riser and access hatch assembly 70 with a manhole access cover 72, a manhole access cover frame 74, and manhole access risers 76.

Figure 23:
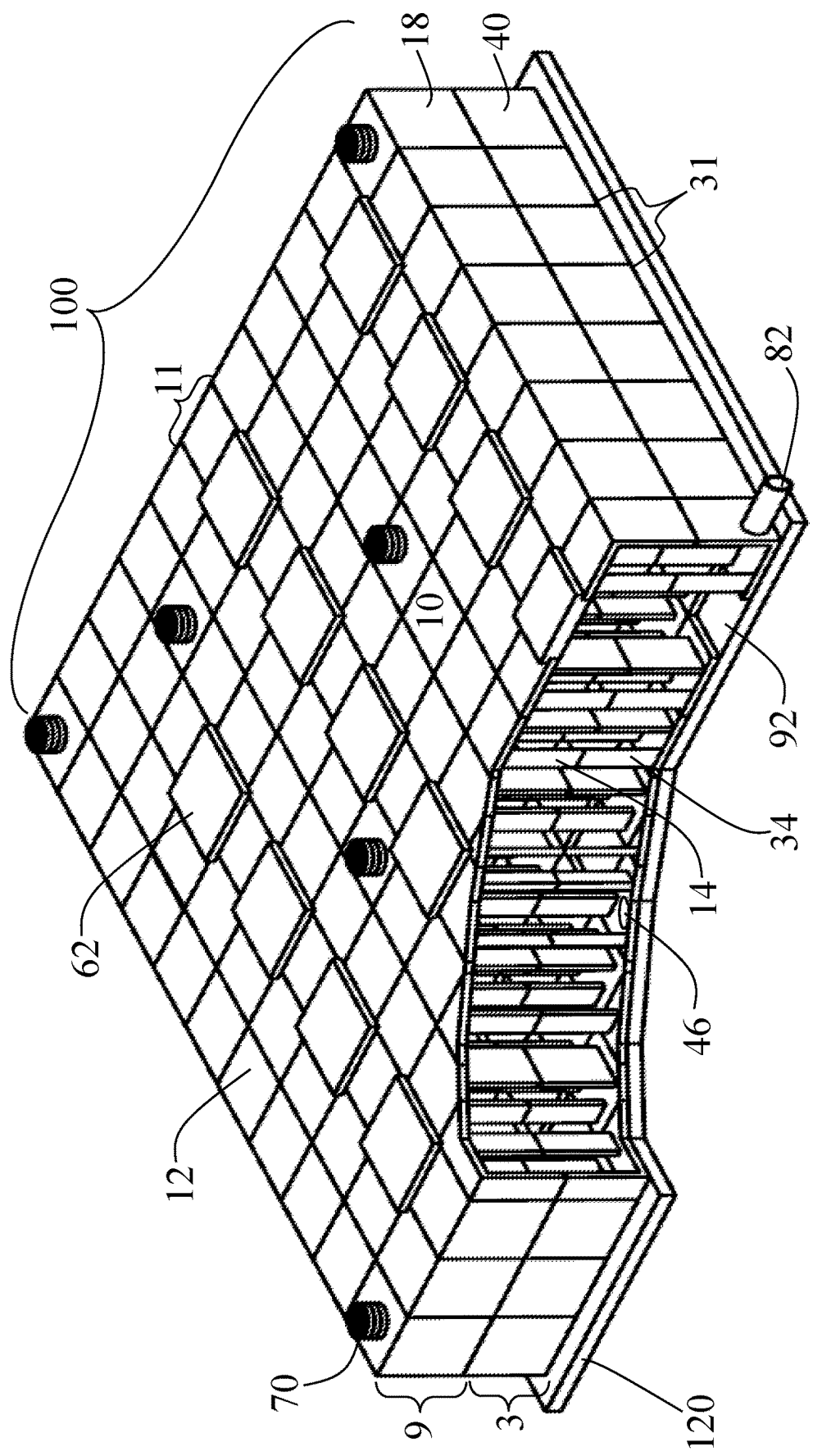
FIG. 23 illustrates three-dimensional and cut-away view of a complete storage system assembly with top slabs and side panels, in accordance with one embodiment.

FIG. 23 presents a three-dimensional, cut-out view of a complete storage system assembly 100 on a gravel base 120, in accordance with one embodiment. Other elements of the invention include: top slabs 62, top module tops 12, access risers and access hatch assemblies 70, top module side walls 18, bottom module side walls 40, an outflow pipe 82, perimeter top modules 11, perimeter bottom modules 31, perimeter corner bottom modules 3, perimeter corner top modules 9. Internally, this figure presents the drainage hole 46, top module legs 14, bottom module legs 34, internal top modules 10 and module assembly internal void areas 92.

Figure 24:
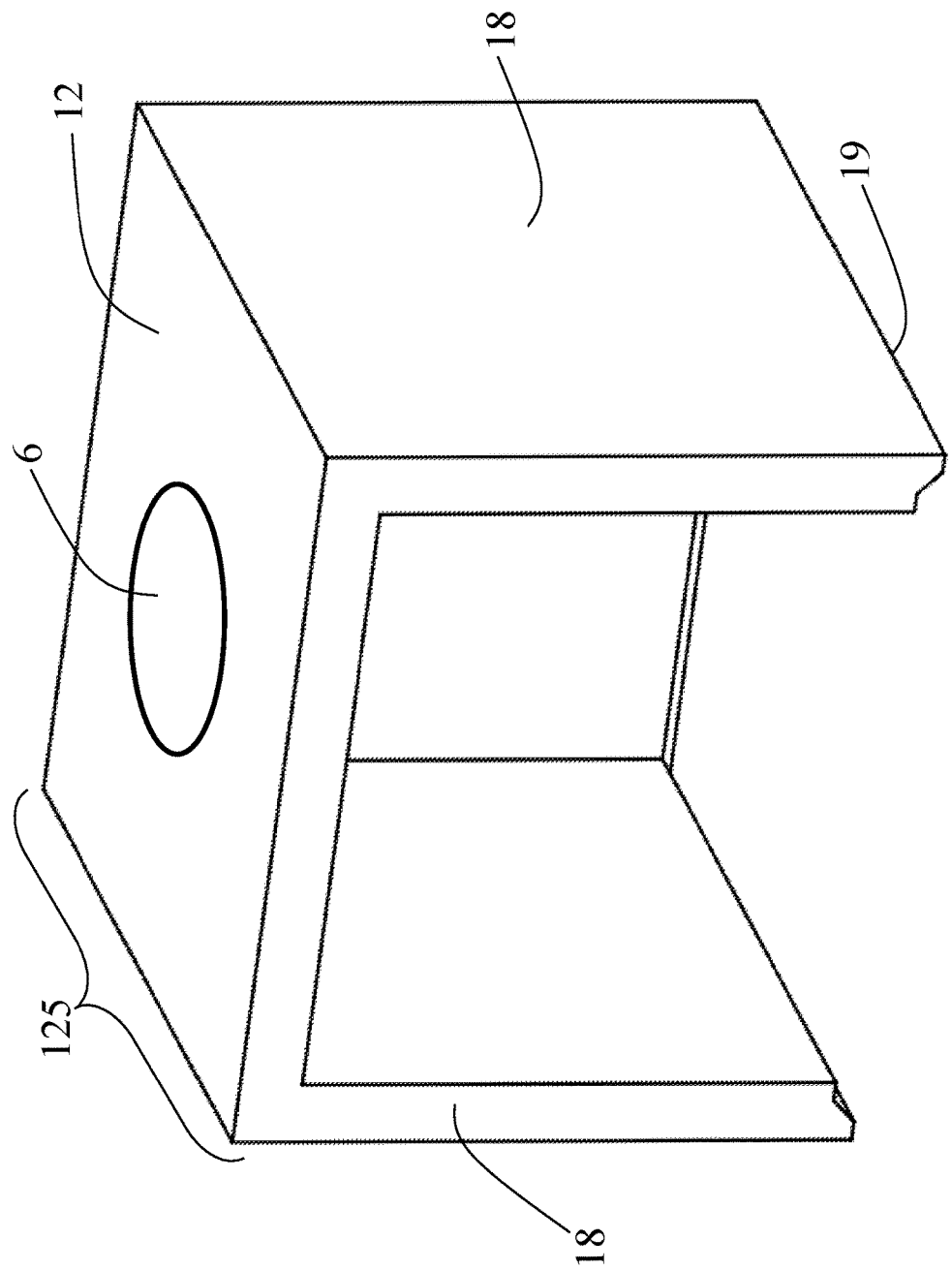
FIG. 24 illustrates a perspective view of a perimeter top module with three walls, in accordance with one embodiment.

FIG. 24 depicts a perimeter three-walled module top 125 comprising an access hole 6, a top module top 12, top module side walls 18, and a top module bottom of wall 19.

Figure 25:
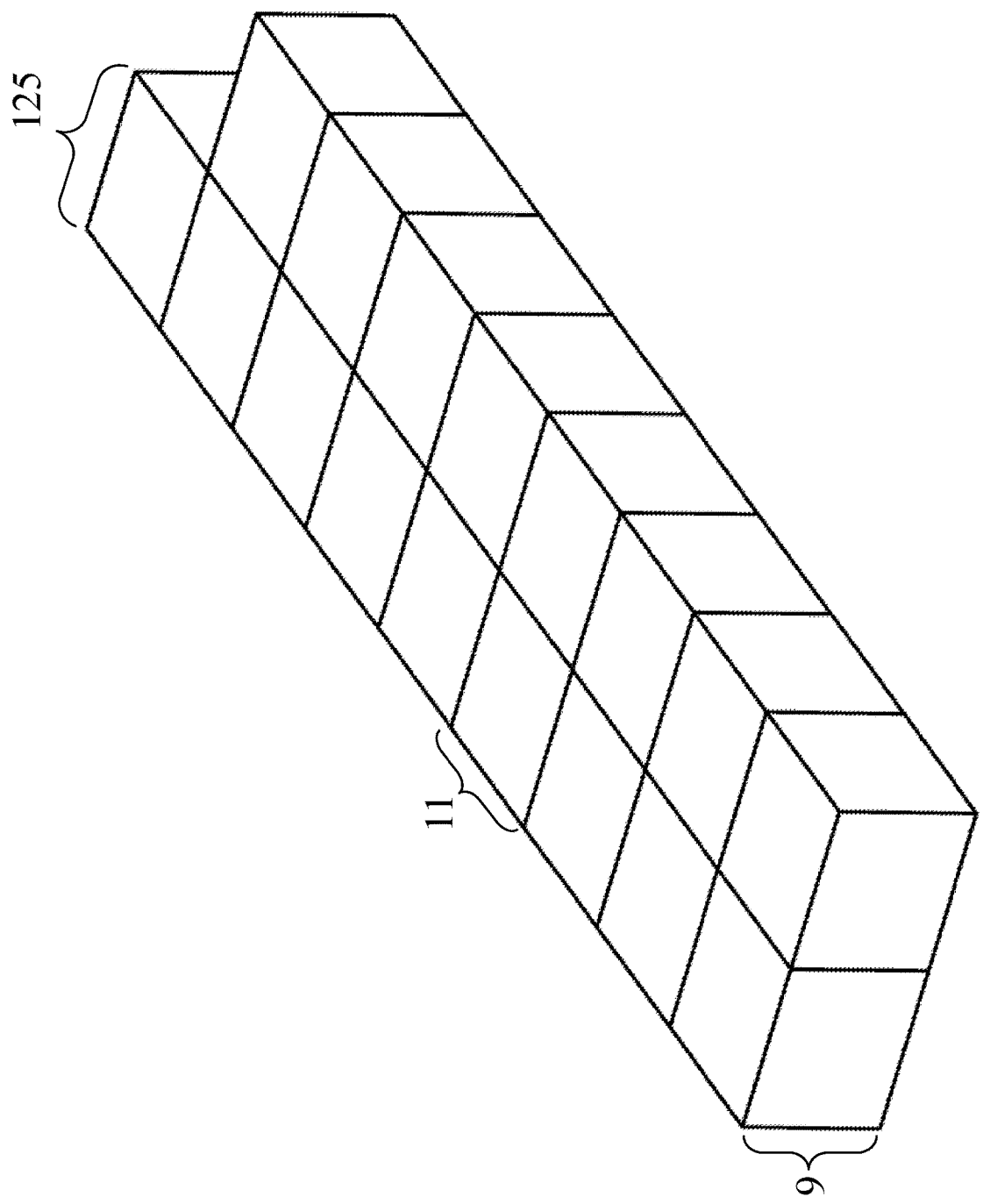
FIG. 25 illustrates a three-dimensional top module assembly of only perimeter modules, in accordance with one embodiment.

FIG. 25 presents a perimeter three-walled module top 125, also featuring perimeter corner top modules 9 and perimeter top modules 11.

Figure 26:
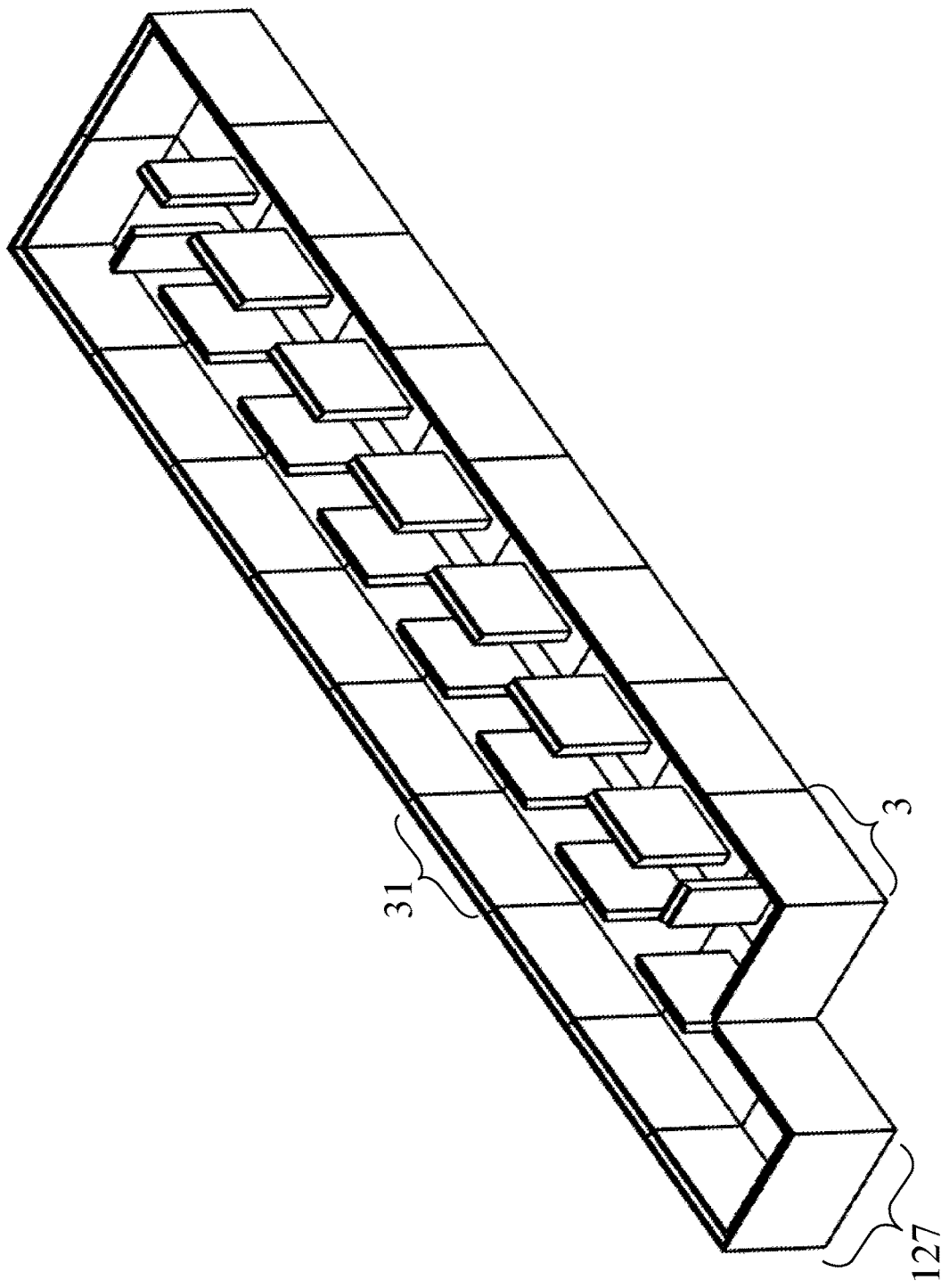
FIG. 26 illustrates a three-dimensional cut-away view of an assembly of only perimeter modules, in accordance with one embodiment.

FIG. 26 presents a perimeter three-walled module bottom 127, also featuring perimeter corner bottom modules 3 and perimeter bottom modules 31.

Figure 27:
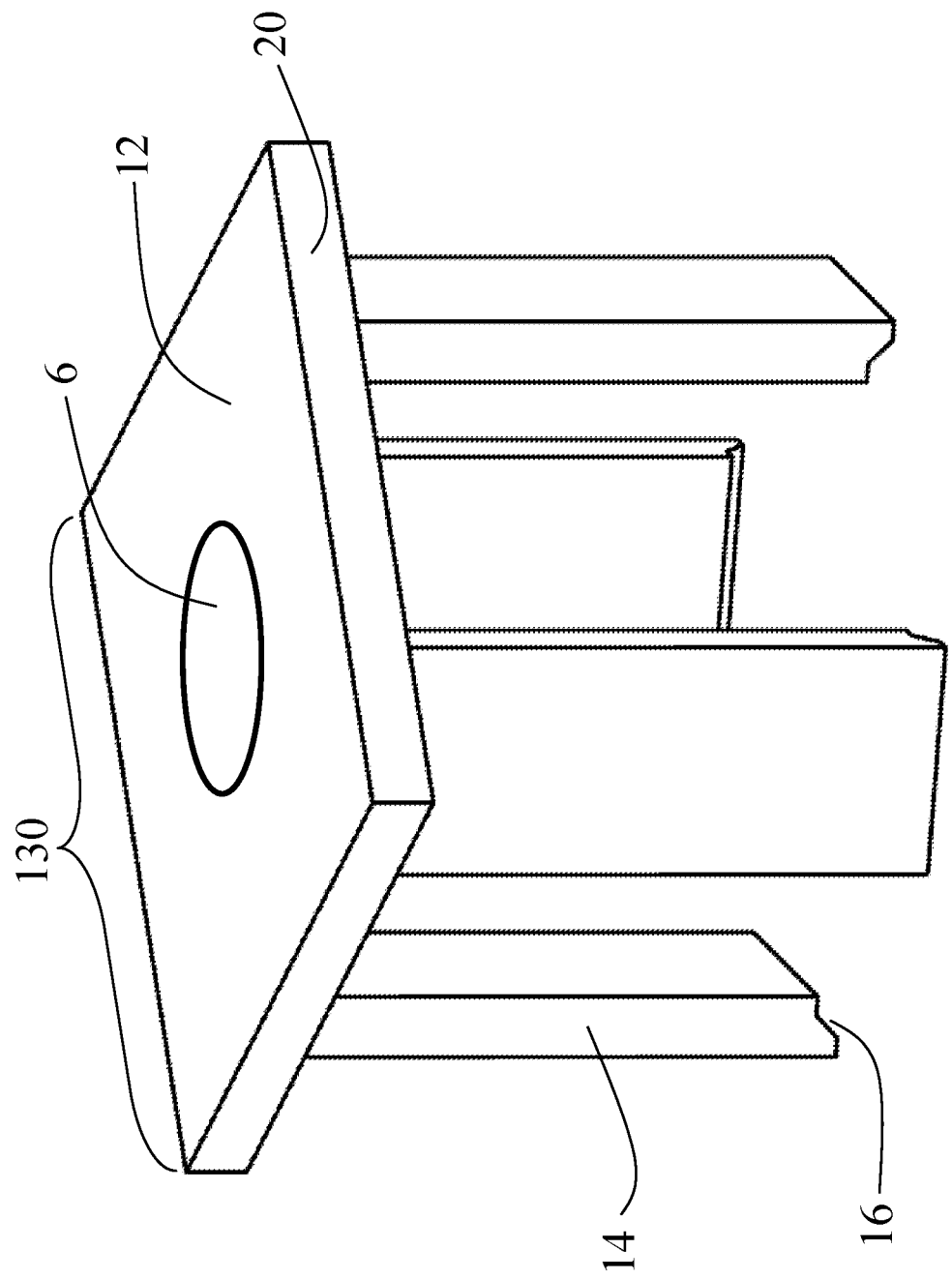
FIG. 27 illustrates a perspective view of an internal top module with four legs, in accordance with one embodiment.

FIG. 27 presents an alternate embodiment of an internal top module with four legs 130 as well as elements seen in other top modules, including: an access hole 6, a top module top 12, a top module side edge 20, and top module legs 14 with top module bottoms of legs 16.

Figure 28:
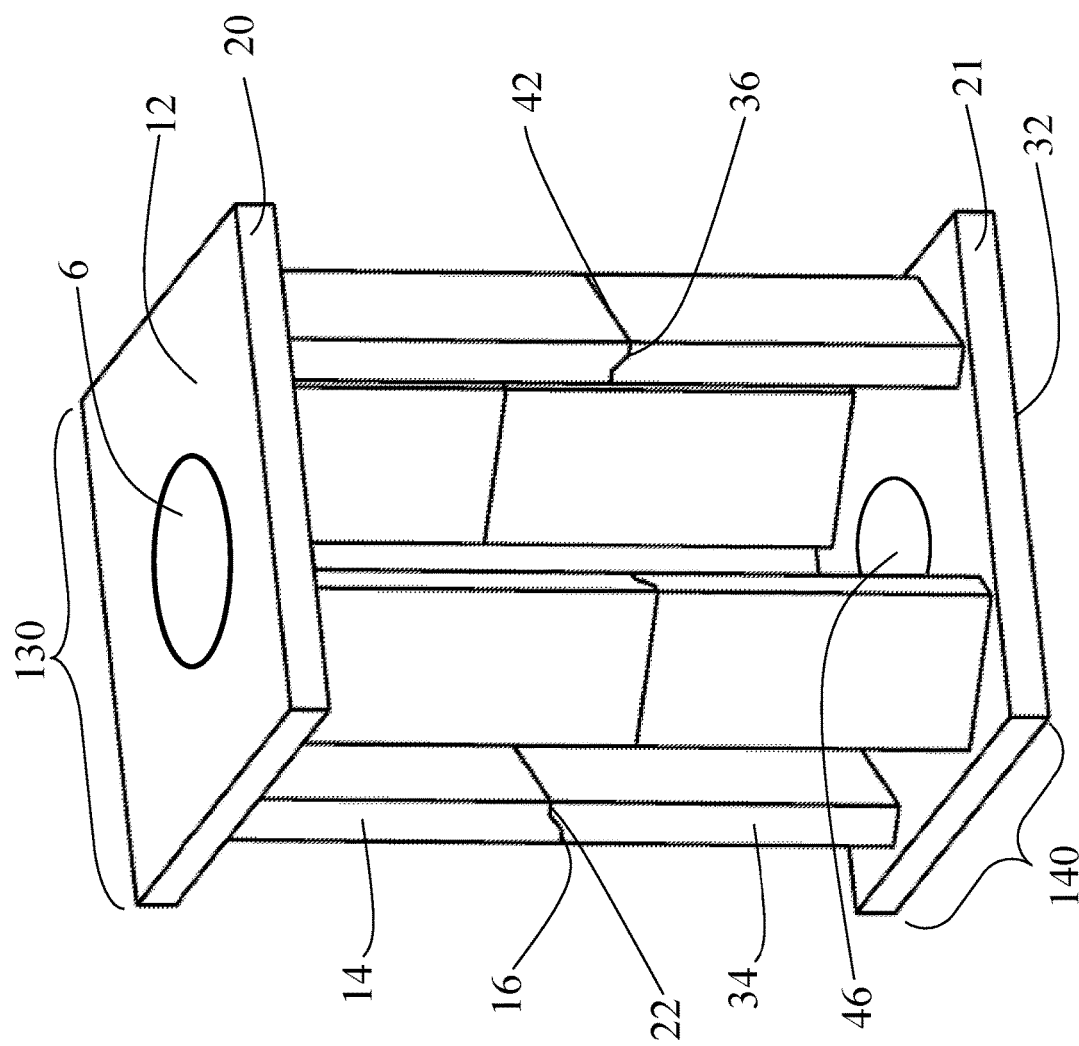
FIG. 28 illustrates a perspective view of an internal top module with four legs assembled with an internal bottom module with four legs, in accordance with one embodiment.

FIG. 28 presents an assembled combination of an internal top module with four legs 130 and an internal bottom module with four legs 140. Also depicted are elements of the invention previously seen, including: an access hole 6, a top module top 12, a top module side edge 20, and top module legs 14 with top module bottoms of legs 16. Pertaining to the bottom module with four legs 140, other elements presented include: a drainage hole 46, a bottom module floor 32, bottom module side edges 21, four bottom module legs 34 with bottom module tops of legs 36 and bottom module female ship lap joints 42.

Figure 29:
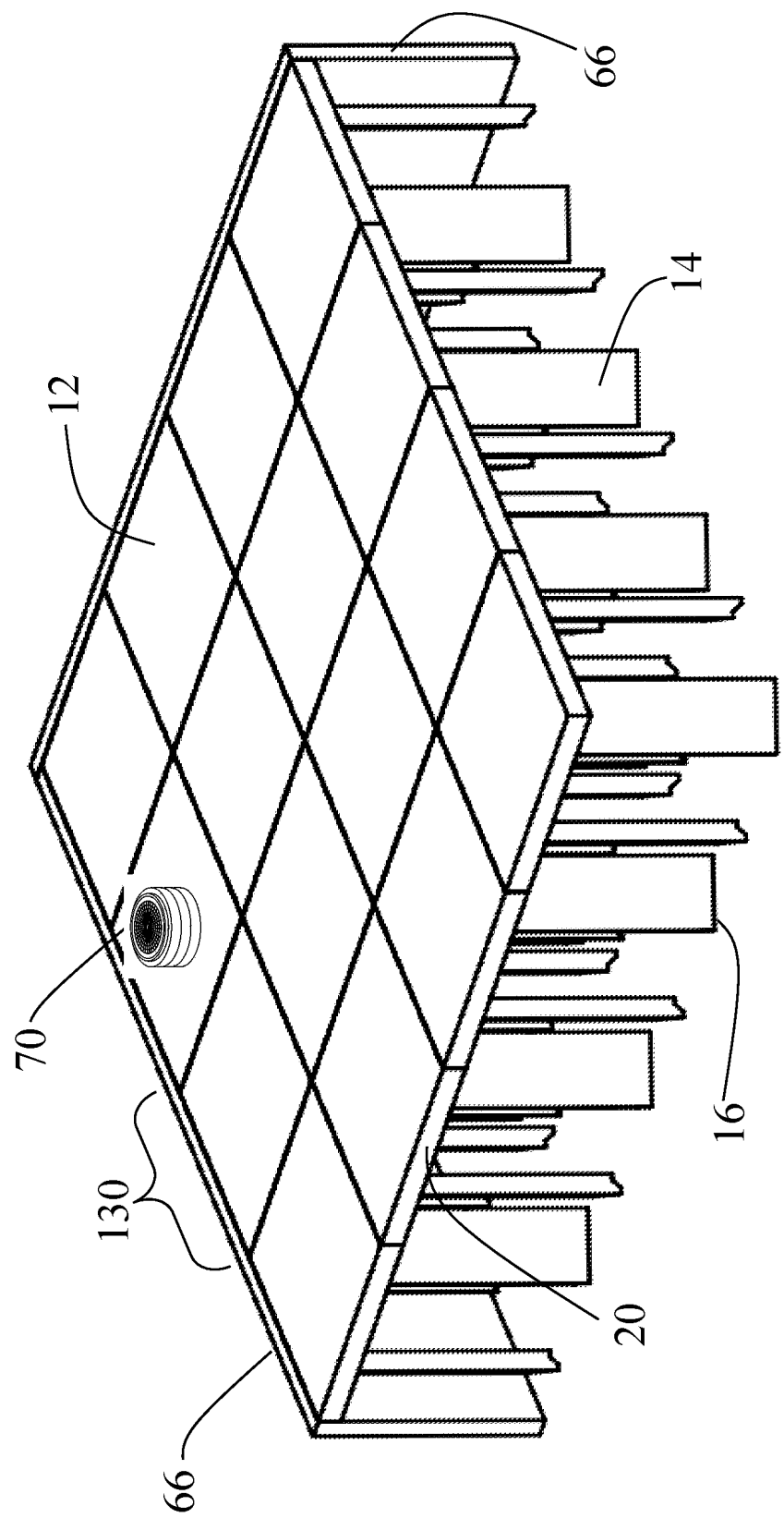
FIG. 29 illustrates a perspective view tesselated internal top modules with four legs, in accordance with one embodiment.

FIG. 29 presents an assembly of internal top modules with four legs 130 and top module tops 12, an access riser and access hatch assembly 70, and side wall panels 66. Also presented are the top module side edges 20, the top module legs 14, and the top module bottoms of legs 16.

FIG. 30 presents a perimeter top module 11 layered with a perimeter bottom module 31. Both the top and bottom modules have one wall and one leg. The perimeter top module 11 depicts a top module top 12 with a top module side edge 20 and an access hole 6. It also presents the top module side wall 18 and the top module leg 14 with a top module bottom of leg 16 and top module male ship lap joint 22.

Further, FIG. 30 depicts elements common in a bottom module, including: a bottom module floor 32 with a bottom module side edge 21 and a drainage hole 46. Also presented is a bottom module side wall 40 with a top module bottom of wall 19 and a bottom module top of wall 41, as well as a bottom module leg 34 with a bottom module top of leg 36 and a bottom module female ship lap joint 42.

Figure 31:
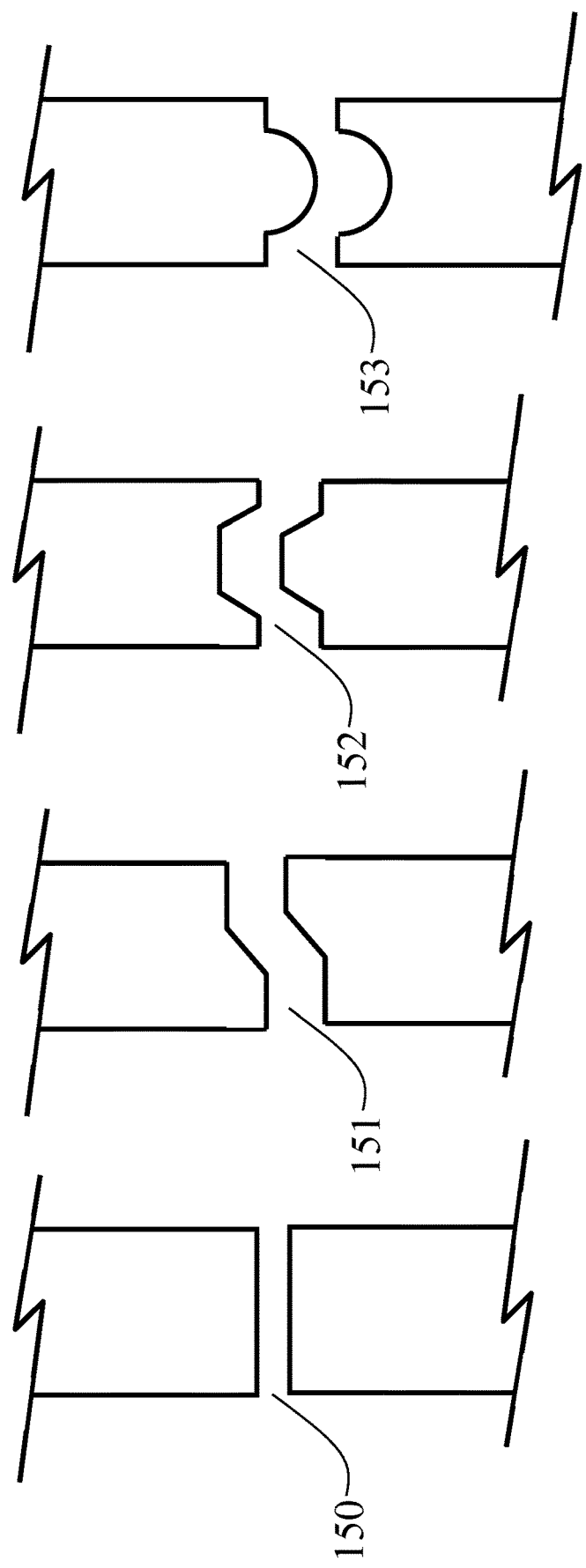
FIG. 31 illustrates a side view of a series of different joints for combining top and bottom leg and wall modules, in accordance with one embodiment.

FIG. 31 demonstrates several types of connection joints to connect legs of top and bottom modules. From left to right, there is an example of top and bottom legs without flat surfaces 150, assembled via a ship lap joint 151, a groove joint 152, and a ball and socket joint 153. The utilization of differing joints depends largely on the ambient soil load pressures of a particular site location. For example, top module male ship lap joint 22 (as seen in FIG. 2) and a bottom module female ship lap joint 42 creates a connection between the layered modules together without risk of horizontal shifting of the two stacked modules.

Figure 32:
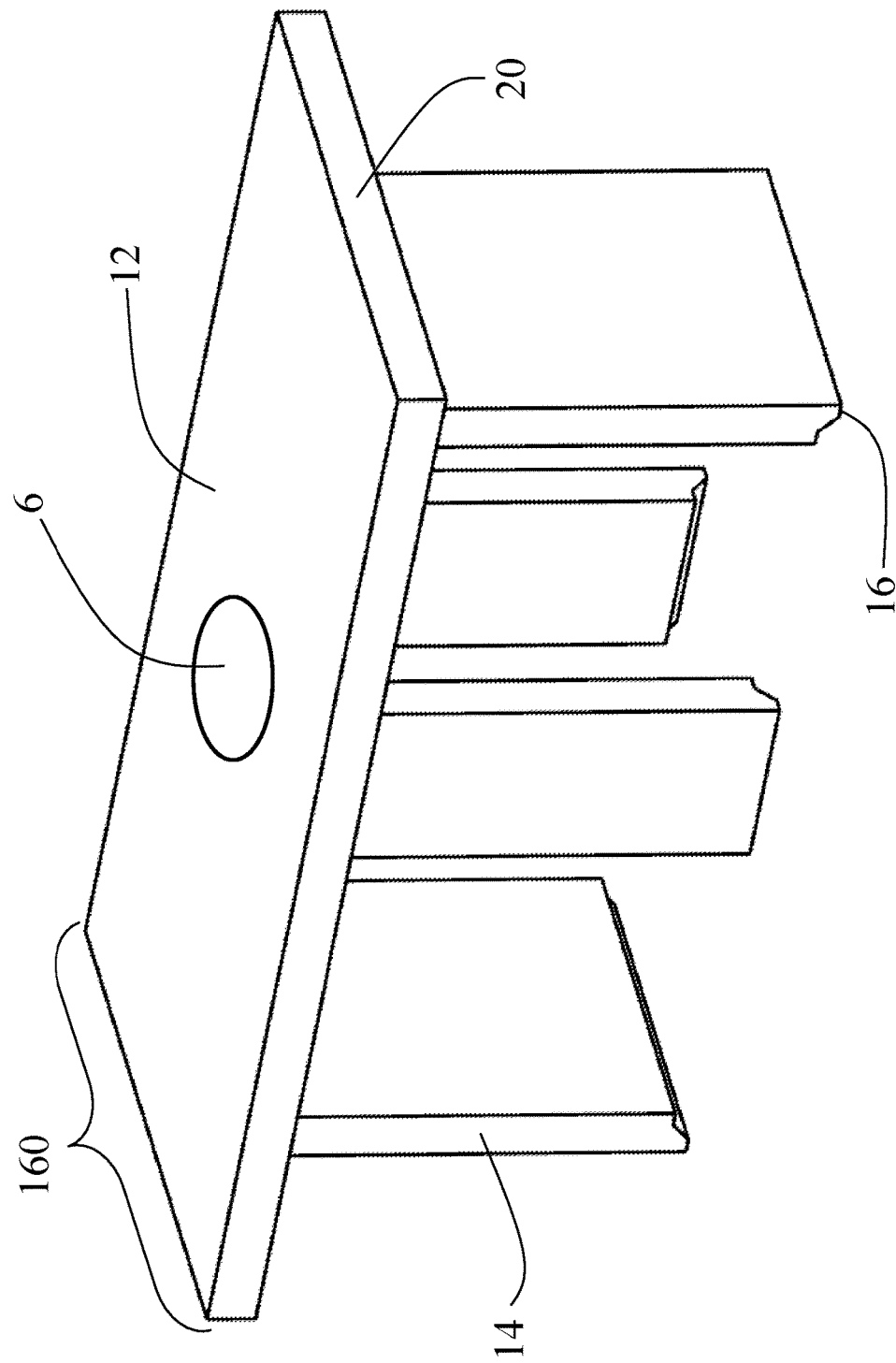
FIG. 32 illustrates a perspective view of an internal rectangular top module, in accordance with one embodiment.

FIG. 32 presents an alternative embodiment wherein the modules are rectangular. For example, this internal rectangular top module 160 has a top module top 12 with top module side edges 20 and an access hole 6. It also has four top module legs 14 with corresponding top module bottoms of legs 16. It is noted that as with square modules, rectangular modules may be configured with a varying array of walls and legs.

Figure 33:
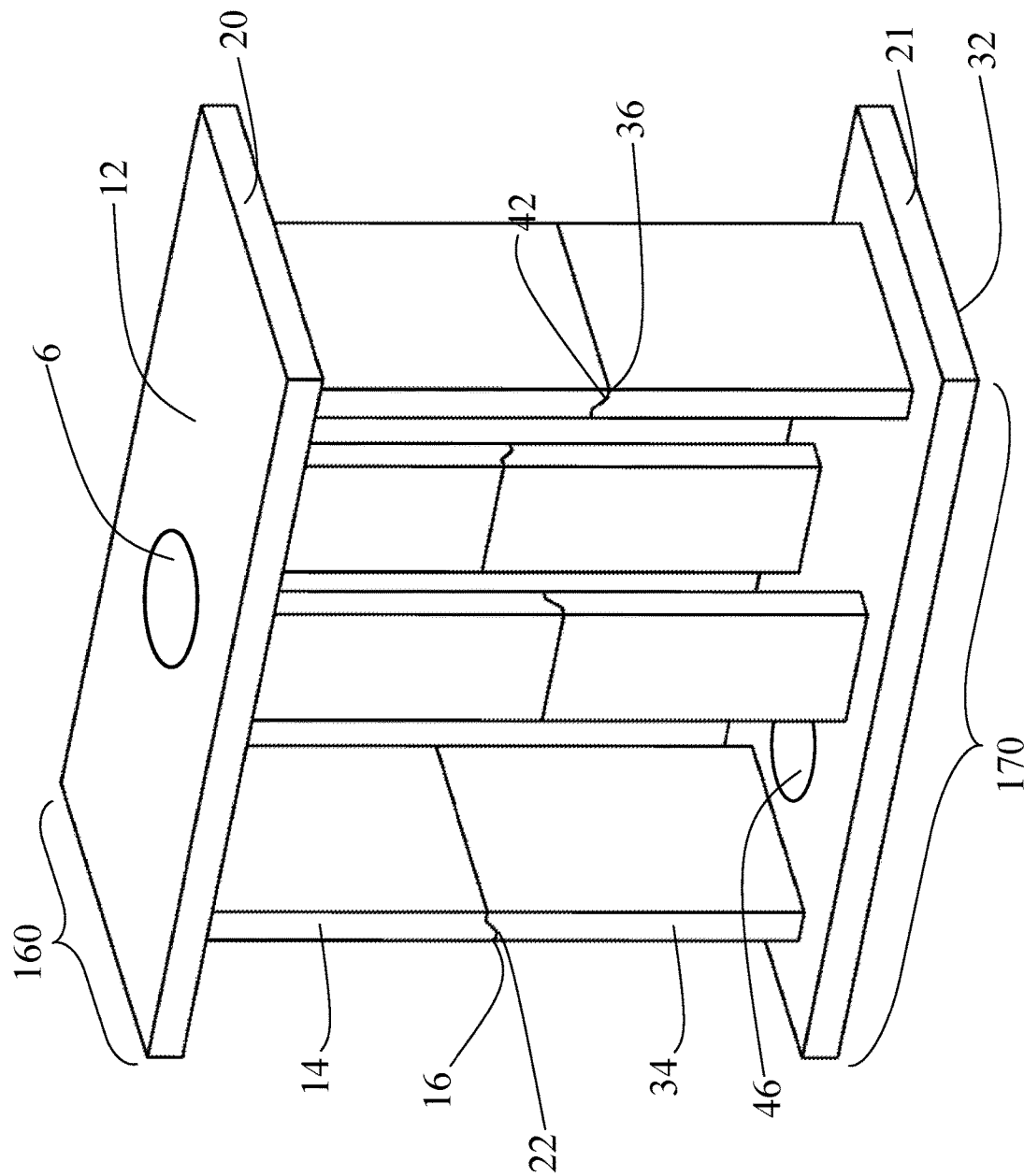
FIG. 33 illustrates a perspective view of the assembly of interior top and bottom rectangular modules, in accordance with one embodiment.

FIG. 33 presents an internal rectangular top module 160 layered with an internal rectangular bottom module 170. In this figure, the internal rectangular top module 160 includes: a top module top 12 with top module side edges 20 and an access hole 6. It also has four top module legs 14 with corresponding top module bottoms of legs 16 and top module male ship lap joints 22.

Also presented in FIG. 33 is the internal rectangular bottom module 170 with a bottom module floor 32, bottom module side edges 21, and a drainage hole 46. Also presented are four bottom module legs 34, each with bottom module tops of legs 36 and bottom module female ship lap joints 42.

In certain embodiments, the tesselated module and assembly of modules include joint lines between modules which can be sealed with a waterproof sealant or the entire module assembly wrapped in a plastic liner to make the storage system water tight.

Conjoining of the modules is not limited to joints wherein differing construction environments may require different assembly methods, to increase, for example, the strength of the assembled module, may be employed and are possible and have been contemplated without departing from the scope of the present disclosure.

In another embodiment, the addition of side walls on the top module 18 of FIG. 7 and the bottom module 31 of FIG. 8 may be installed to define a perimeter.

The top module 10 can be used in conjunction with other square top modules 10, placed side-by-side, to create a tessellated module assembly 50 as represented in FIG. 9. The assemblies 50 made of square top modules 10 can only be made so tall due to manufacturing limitations of the top modules side wall 18 height. When taller module assemblies 51 are required as in FIG. 10, the top module 10 can be stacked on top of a bottom module 30 to form a taller assembled module 50. This taller assembled module can be twice as tall as a single top module 10 therefore resulting in taller tessellated module assemblies 51 capable of storing larger volumes of water. External top 11 and bottom 31 modules are placed around the perimeter of the assembly 51 to define its outer extent.

The tessellated module assemblies 50 made of many top modules 10 or stacked top 10 and bottom 30 assembled modules are placed side-by-side in rows to create various shapes that are all arranged in a tessellated pattern as in FIG. 13. As the number of stacked top 10 and 11 and bottom 30 and 31 internal and external modules grow the more flexibility there is to vary the shape of the complete storage assembly 100 into squares, circles, rectangles, L shapes, S shaped, U shaped and other shapes required to fit within the construction site constraints.

Referring to FIG. 15, in certain embodiments, the individual modules have to be configured so that each module is in fluid communication with one another to allow water to fill up all modules evenly. This is achieved through minimization of perimeter top modules 10 and 11, side walls 18, and perimeter bottom modules 30 and 31, side walls 40 by only placing them along the perimeter of the complete storage system assembly 100. Modules 11, 31, located on the perimeter of the tessallated module assembly 100, will have solid side walls 18, 40 as the complete storage system assembly 100 will be buried underground and be surrounded in soil.

Notably, others have used assemblies defining lateral and longitudinal channels to distribute water through underground assembly. In contrast, the present technology's enhanced function of the tessellated module assembly has improved performance, functionality and accessibility of the complete storage system assembly 100 by allowing water to freely flow and fill the assembly in all directions 110 unimpeded by channels as shown in FIG. 19 without any defined channels Additionally, as in FIG. 22 and FIG. 23, access riser and hatch assemblies 70, which are composed of a manhole cover 72, manhole cover frame 74, and one or more manhole access risers 76 to bring the assembly 70 up to ground level. Access into the tessellated module assembly 10 is provided via this access riser and hatch assembly 70 via a hole 6 in the top 12 of the top module 10 as shown in FIG. 1.

Because of the complete storage system assembly 100 is a tessellated array, each individual module 3, 9, 11, and 31 along the perimeter is supported and connected by at least two or three adjacent modules 3, 9, 10, 11, 30 and 31, two modules 3, 9, 11, and 31 in the corners and three modules 3, 9,10, 11, 30 and 31 along the sides. The load distribution of this configuration is optimized due the to the tessellated configuration of the complete storage system assembly 100. Outer perimeter modules 3, 9, 11 and 31 make contact with other modules 3, 9, 10, 11, 30 and 31 and the contact is made at ninety degree angles so the load on the perimeter modules 3, 9, 11 and 31 is dispersed evenly to other modules 3, 9, 10, 11, 30 and 31. This even load disbursement provides the complete storage system assembly 100 with maximum compression strength and thus able to handle soil pressures associated with deep installations.

Furthermore, referring to FIG. 13 and FIG. 14 and FIGS. 15 to 18, because of the load distribution among modules 3, 9, 10, 11, 30 and 31, some of the inner modules 10 and 30 can be removed, usually in a checkerboard pattern for adjacent rows and columns in a complete storage system assembly 100. The tessellated shaped pattern of the complete storage system assembly 100 allows for the removal of the inner modules 10 and 30, without loss of strength. The internal void area 92 reduces the number of internal modules needed (10 and 30), and reduces the overall cost of the complete storage system assembly 100. In some cases, two adjacent modules (10 and 30) in the same row or same column can be removed without sacrificing strength of the complete storage system assembly 100. Overall the system is more efficient and more economically feasible due to less material being used to store the same amount of water along with decreasing the overall shipping costs that would be associated with additional internal modules 10 and 30.

Referring again to FIG. 18, it is shown that additional top slabs are used to cover the module assembly internal void areas 92 to create an enclosed chamber. For locations where a single module 10 and 30 is removed, FIG. 14, as an example, depicts a top slab 62 can be placed over the void 92.

FIGS. 16 and 17 are side-views of the complete storage system assembly 100, and showing that inflow pipes 80 and outflow pipes 82 can enter the complete storage system assembly 100 at various positions on the side walls 18, 40 or 66 (not shown) of the modules 11 and 31. The position of the top slab 62 are also shown sitting above the module top 10 and forming a roof over the complete storage system assembly 100 as depicted in one embodiment.

In accordance with one embodiment, FIG. 17, a side-cut-away view of the complete storage system assembly 100 showing the internal components of the system including drainage holes 46, access riser and access hatch assembly 70 and the top slabs 62 is presented. This top slab is designed with flat top, of various thicknesses to handled surface loading conditions, and further have a notch down 68 on their bottom sides, as depicted in FIG. 11, in accordance with one embodiment. Further, FIG. 13, FIG. 14 and FIG. 15 lock the top slab 62 in place when placed over the internal void areas 92. The notch down 68 is slightly narrower than the internal void area 92 on all sides and the top slab 62 larger than the void areas 92, in accordance with a further embodiment.

FIG. 18 is an illustrated embodiment of a top-view looking down on the 100 and the resulting tessellated pattern is formed. Access riser and access hatch assemblies 70 are positioned throughout key points in individual module tops 10, allowing access into the complete storage system assembly 100 through access holes 6 for maintenance and cleaning of the complete storage system assembly 100.

FIG. 19 presents a top-cut-away-view showing the internal space of the complete storage system assembly 100, including various combinations of individual module walls 40, the internal void areas 92, side wall panels 66 along the two perimeter sides, and optional drainage holes 46, in accordance with one embodiment. Furthermore, FIG. 19 demonstrates, through use of arrows 110, how water flows from inflow pipes 80 to a first module and flows to other modules and internal void areas 92 unimpeded. Internal modules 10 and 30 allow water to flow freely in all directions, with no defined channels for more efficient distribution of fluid within the complete storage system assembly 100 and eventually exit via the outflow pipe 82 and/or infiltrate back into the soil below via drainage holes 46.

FIG. 24 is an illustrated embodiment of a top module 10 and the associated internal metal rebar 8 configuration. For example, in one embodiment of modules 10 made of concrete, the structure has to be reinforced with rebar and/or rebar mesh 8, oriented in a criss-cross pattern. The rebar 8 should be used in the internal top module 10 and the top module top 12, sides 20 and legs 14. See FIG. 21 as an example. Also, the rebar 8 should be used in the internal square bottom module's 30 floor 32, sides 40 and legs 34. The size and amount of rebar 8 is a function of the structure load requirements and soil conditions. This same rebar reinforcement would also be used in top slab 62 and side wall panel 66 and also including the manhole access risers 76.

In other embodiments composite or metal strands or other suitable construction materials in addition to metal rebar 8 or in place of rebar to reinforce the concrete or replace the need for rebar, may be employed and are possible and contemplated without departing from the scope of the present disclosure.

In an additional embodiment, the modules can be set up with the exterior (perimeter and corner) bottom module 31 and 3 having a solid floor section to detain or retain water. If infiltration of storm water into native soil is allowable or desired, the floor of each bottom module can include a drainage hole 46 to allow captured storm water to exit through the bottom 32 of each bottom module 3, 30, and 31 into the underlying rock base 120 layer and or native soil for ground water recharge. FIG. 15, employs a gravel base 120; however, it is understood that this representation is an example and that other representations, for example, a concrete slab, native soil are possible and contemplated without departing from the scope of the present disclosure.

In yet another embodiment, FIG. 22 shows three components of the access riser and access hatch assembly 70 which consists of one or more manhole access risers 76 to bring the manhole access cover 72 and frame 74 up to ground level.

In another embodiment, drainage holes at the bottom of a module allow storm water to fully drain out through the bottom 32 of each bottom module 3, 30, and 31 preventing standing water. FIG. 10 illustrates one embodiment of assembled top 9, 10, and 11 and bottom modules 3, 30, and 31 a single drainage hole 46; however, a module may contain zero to many drainage holes 46 placed in the bottom modular floor 32 of the internal bottom module floor 30 when infiltration of water back into the native soil below the complete storage system assembly 100 (not shown) is desired, see FIG. 3 as an example. Drainage holes 46 allow water to exit the system evenly throughout every bottom module 3, 30, and 31. To connect the complete storage system assembly 100, both inflow pipes 80 and outflow pipes 82 (as seen in FIG. 14) can be connected to the complete storage system assembly with top slabs and side panels 100 through any of the module side walls 18, 40 as depicted in FIGS. 17 and 66 as best seen in FIG. 9.

In some embodiments, a tesselated complete storage system assembly 100 as exampled in FIG. 23 for the underground collection and storage of water are built to handle site specific loading conditions. Surface loads applied to underground storage systems vary based upon pedestrian and vehicular traffic, and can be broken down into the following categories may be employed and are possible and contemplated without departing from the scope of the present disclosure.

Parkway loading includes sidewalks and similar areas that are adjacent to streets and other areas with vehicular traffic. Indirect traffic loading includes areas that encounter daily low speed traffic from vehicles ranging from small cars up to semi-trucks. Direct traffic loading includes areas, such as streets and interstates that encounter a high volume of high speed traffic from vehicles ranging from small cars to large semi-trucks. There is also heavy duty equipment loading that includes traffic from, for example, airplanes and heavy port equipment.

Accordingly, underground storage systems of the present invention may be constructed having walls, floors, and/or ceilings of various thicknesses, shapes and strengths (e.g., differing thicknesses of concrete or steel or differing amounts of rebar) such that they achieve a parkway load rating (e.g., a H10 load rating), an indirect traffic load rating (e.g., a H20 load rating), a direct traffic load rating (e.g., a H20 load rating), or a heavy duty equipment load rating (e.g., a H25 load rating), as required for a given installation site. Such embodiments may be employed and are possible and contemplated without departing from the scope of the present disclosure.

The above specification, examples, and data provide a complete description of the structure and use of exemplary embodiments. Feature(s) of the different embodiment(s) may be combined in yet another embodiment without departing from the recited claims.

We claim:

1. An assembly system for storing water underground, wherein the assembly system is comprised of a plurality of individual adjoining four-sided modules forming a four-sided tessellation configuration,
    wherein each four-sided module is comprised of a four-sided top, a combination of walls and/or legs extending downward from said four-sided top depending on their position within the assembly,
    wherein modules along the perimeter of the assembly contain one wall to define the perimeter of the assembly to create an overall enclosed storage system,
    wherein modules at the perimeter corner of the assembly contain two walls, adjacent to one another, to define the perimeter corner of the assembly to create an overall enclosed storage system,
    wherein, said walls are defined by extending vertically downward from said four-sided, along its edges so that said top and walls intercept one another at their ends,
    wherein said modules along the perimeter have one or two legs extending vertically from the four-sided, and positioned inward from the edges of the four-sided, and are positioned on sides of the four-sided top not having walls,
    wherein modules not along the perimeter of the assembly only having three legs extending vertically from the four-sided top, and positioned inward from the edges of the four-sided top,
    wherein said legs on modules not along the perimeter of the assembly having an orientation with two shorter legs running parallel to one another spaced apart having a length less than half the length of the four-sided top and one longer leg running perpendicular to the two shorter legs, and having a length more than half the length of the four-sided top,
    wherein the resulting assembly of internal and perimeter modules is defined by only having perimeter walls, and multiple internal legs, said legs not in contact with one another within modules or between adjacent modules, spaced out away from all adjacent legs by at least one foot but not more than ten feet, and resulting in a system with no defined channels,
    wherein said modules of four-sided assembly are arranged as a four-side tiling in which four, four-sided modules meet at each vertex such that all walls of all modules are of the same width and are assembled such that walls of adjacent modules are lined up symmetrically with walls of all other modules, resulting in only 90 degree angles at each vertex of all adjoined four-sided modules so four modules at a point make a full 360 degrees,
    wherein at least one said module has an access hole in its top for access into said assembly system after installation underground.

2. A four-sided tessellation assembly system of claim 1, wherein the modules are stacked together to create a taller overall module,
    wherein one module, known as the top module, has a four-sided top with downward extending legs and/or walls, and second module, known as the bottom module having a four-sided bottom with upward extending legs and/or walls,
    wherein modules being stacked have identical combinations of legs and/or walls, and the top module is stacked directly over the bottom module and secured in place utilizing joints placed at the bottom edge of the side legs and/or walls of the four-sided top module and the top edge of the side walls of the four-sided bottom module, respectively.

3. A four-sided tessellation assembly system of claim 2, where the four-sided top module, four-sided bottom module, four-sided top slab, and side panel are all comprised of concrete reinforced with rebar.

4. A four-sided tessellation assembly system of claim 2, wherein the joint is a shiplap joint, with one module having a female joint and the other module having a male joint.

5. A four-sided tessellation assembly system of claim 2, wherein the joint is a trapped groove, with one module having a female joint and the other module having a male joint.

6. A four-sided tessellation assembly system of claim 1, containing one or more inflow and/or outflow pipes in module tops or walls.

7. A four-sided tessellation assembly system of claim 1, containing drainage holes in the bottom of said module to allow water to exit the system and percolate into underlying gravel layer or soils.

8. A four-sided tessellation assembly system of claim 1, in which up to 35% of internal four-sided shaped modules with legs are removed without reducing the overall assembly strength and resultant internal void areas are covered by a four-sided shaped top slab larger than the resultant void area of the removed module(s), said four-sided top slab having a notch down on its bottom side that is smaller than the void area to lock it in place within the assembly.

9. A four-sided tessellation assembly system of claim 1, in which vertically extending side panels are added to the external perimeter of the assembly as opposed to having perimeter modules with built in walls and legs, said assembly only containing internal modules.

10. A four-sided tessellation assembly system of claim 1, where the top access hole is covered with an access frame and cover and includes access risers to extend the access frame and cover to finish surface from the top access hole located underground.

11. A four-sided tessellation assembly system of claim 1, made water tight using an impervious liner, sealant or other means to prevent leakage.

12. A four-sided tessellation assembly system of claim 1, wherein only bottom modules along with top slabs are stacked and assembled to form a storage system.

13. A four-sided tessellation assembly system of claim 1, where the top access hole is covered with an access frame and cover.

14. An assembly system for storing water underground, wherein the assembly system is comprised of a plurality of individual adjoining four-sided modules, forming a four-sided tessellation configuration,
wherein each four-sided module is comprised of a four-sided top, a combination of walls and/or legs extending downward from said four-sided top depending on their position within the assembly,
wherein modules along the perimeter of the assembly contain one or more walls to define the perimeter of the assembly to create an overall enclosed storage system,
wherein, said walls are defined by extending vertically downward from said four-sided top, along its edges so that said top and walls intercept one another at their ends,
wherein said modules along the perimeter have one or two legs extending vertically from the four-sided top, and positioned inward from the edges of the four-sided top, and are positioned on sides of the four-sided top not having walls,
wherein modules not along the perimeter of the assembly only having three legs extending vertically from the four-sided top, and positioned inward from the edges of the four-sided top,
wherein the resulting assembly of internal and perimeter modules is defined by only having perimeter walls, and multiple internal legs, said legs not in contact with one another within modules or between adjacent modules, spaced out away from all adjacent legs by at least one foot but not more than ten feet, and resulting in a system with no defined channels,
wherein said modules of four-sided shaped assembly are arranged as a four-sided tiling in which four modules meet at each vertex such that all walls of all modules are of the same width and are assembled such that walls of adjacent modules are lined up symmetrically with walls of all other modules, resulting in only 90 degree angles at each vertex of all adjoined four-sided modules so four modules at a point make a full 360 degrees, wherein at least one said module has an access hole in its top for access into said assembly system after installation underground.

15. A four-sided tessellation assembly system of claim 14, wherein the modules are stacked together to create a taller overall module,
wherein one module, known as the top module, has a four-sided top with downward extending legs and/or walls, and second module, known as the bottom module having a four-sided bottom with upward extending legs and/or walls,
wherein modules being stacked have identical combinations of legs and/or walls, and the top module is stacked directly over the bottom module and secured in place utilizing joints placed at the bottom edge of the side legs and/or walls of the four-sided top module and the top edge of the side walls of the four-sided bottom module, respectively.

16. A four-sided tessellation assembly system of claim 15, where the four-sided top module, four-sided bottom module, four-sided top slab, and side panel are all comprised of concrete reinforced with rebar.

17. A four-sided tessellation assembly system of claim 15, wherein the joint is a shiplap joint, with one module having a female joint and the other module having a male joint.

18. A four-sided tessellation assembly system of claim 15, wherein the joint is a trapped groove, with one module having a female joint and the other module having a male joint.

19. A four-sided tessellation assembly system of claim 14, containing one or more inflow and/or outflow pipes in module tops or walls.

20. A four-sided tessellation assembly system of claim 14, containing drainage holes in the bottom of said module to allow water to exit the system and percolate into underlying gravel layer or soils.

21. A four-sided tessellation assembly system of claim 14, in which up to 35% of internal four-sided modules with legs are removed without reducing the overall assembly strength and resultant internal void areas are covered by a four-sided shaped top slab larger than the resultant void area of the removed module(s), said four-sided shaped top slab having a notch down on its bottom side that is smaller than the void area to lock it in place within the assembly.

22. A four-sided tessellation assembly system of claim 14, in which vertically extending side panels are added to the external perimeter of the assembly as opposed to having perimeter modules with built in legs, said assembly only containing internal modules.

23. A four-sided tessellation assembly system of claim 14, where the top access hole is covered with an access frame and cover and includes access risers to extend the access frame and cover to finish surface from the top access hole located underground.

24. A four-sided tessellation assembly system of claim 14, made water tight using an impervious liner, sealant or other means to prevent leakage.

25. A four-sided tessellation assembly system of claim 14, wherein only bottom modules along with top slabs are stacked and assembled to form a storage system.

26. A four-sided tessellation assembly system of claim 14, where the top access hole is covered with an access frame and cover.

27. An assembly system for storing water underground, wherein the assembly system is comprised of a plurality of individual adjoining rectangular modules forming a rectangular tessellation configuration,
wherein each rectangular module is comprised of a rectangular top, a combination of walls and/or legs extending downward from said rectangular top depending on their position within the assembly,
wherein modules along the perimeter of the assembly contain one wall to define the perimeter of the assembly to create an overall enclosed storage system, wherein modules at the perimeter corner of the assembly contain two walls, adjacent to one another, to define the perimeter corner of the assembly to create an overall enclosed storage system, wherein said walls are defined by extending vertically downward from said rectangular top, along its edges so that said top and walls intercept one another at their ends, wherein said modules along the perimeter have one or two legs extending vertically from the rectangular, and positioned inward from the edges of the rectangular, and are positioned on sides of the rectangular top not having walls, wherein modules not along the perimeter of the assembly only having two or more legs extending vertically from the rectangular top, and positioned inward from the edges of the rectangular top, wherein said legs on modules not along the perimeter of the assembly having an orientation with two shorter legs running parallel to one another spaced apart having a length less than half the length of the rectangular top and two longer legs running perpendicular to the two shorter legs, and having a length less than half the length of the rectangular top, wherein the resulting assembly of internal and perimeter modules is defined by only having perimeter walls, and multiple internal legs, said legs not in contact with one another within modules or between adjacent modules, spaced out away from all adjacent legs by at least one foot but not more than twenty feet, and resulting in a system with no defined channels, wherein said modules of rectangular assembly are arranged as a rectangular tiling in which four, rectangular modules meet at each vertex and are assembled such that walls of adjacent modules are lined up symmetrically with walls of all other modules, resulting in only 90 degree angles at each vertex of all adjoined rectangular modules so four modules at a point make a full 360 degrees, wherein at least one said module has an access hole in its top for access into said assembly system after installation underground.

28. A rectangular tessellation assembly system of claim 27, in which vertically extending side panels are added to the external perimeter of the assembly.

29. A four-sided tessellation assembly system of claim 27, where the top access hole is covered with an access frame and cover.

30. An assembly system for storing water underground, wherein the assembly system is comprised of a plurality of individual adjoining four-sided modules, forming a four-sided tessellation configuration, wherein each four-sided module is comprised of a four-sided top, legs extending downward from said four-sided top, wherein modules of the assembly only having three legs extending vertically from the four-sided top, and positioned inward from the edges of the four-sided top, wherein four-sided tessellation assembly includes vertically extending side panels that are added to the external perimeter of the assembly, wherein the resulting assembly of modules and side panels is defined by only having perimeter walls, and multiple internal legs, said legs not in contact with one another within modules or between adjacent modules, spaced out away from all adjacent legs by at least one foot but not more than ten feet, and resulting in a system with no defined channels, wherein said modules of four-sided shaped assembly are arranged as a four-sided tiling in which four modules meet at each vertex such that all walls of all modules are of the same width and are assembled such that walls of adjacent modules are lined up symmetrically with walls of all other modules, resulting in only 90 degree angles at each vertex of all adjoined four-sided modules so four modules at a point make a full 360 degrees, wherein at least one said module has an access hole in its top for access into said assembly system after installation underground.

31. A four-sided tessellation assembly system of claim 30, wherein the modules are stacked together to create a taller overall module, wherein one module, known as the top module, has a four-sided top with downward extending legs and/or walls, and second module, known as the bottom module having a four-sided bottom with upward extending legs and/or walls, wherein modules being stacked have identical combinations of legs and/or walls, and the top module is stacked directly over the bottom module and secured in place utilizing joints placed at the bottom edge of the side legs and/or walls of the four-sided top module and the top edge of the side walls of the four-sided bottom module, respectively.

32. A four-sided tessellation assembly system of claim 31, where the four-sided top module, four-sided bottom module, four-sided top slab, and side panel are all comprised of concrete reinforced with rebar.

33. A four-sided tessellation assembly system of claim 31, wherein only bottom modules along with top slabs are stacked and assembled to form a storage system.

34. A four-sided tessellation assembly system of claim 31, wherein the joint is a shiplap joint, with one module having a female joint and the other module having a male joint.

35. A four-sided tessellation assembly system of claim 31, wherein the joint is a trapped groove, with one module having a female joint and the other module having a male joint.

36. A four-sided tessellation assembly system of claim 30, containing one or more inflow and/or outflow pipes in module tops or walls.

37. A four-sided tessellation assembly system of claim 30, containing drainage holes in the bottom of said module to allow water to exit the system and percolate into underlying gravel layer or soils.

38. A four-sided tessellation assembly system of claim 30, in which up to 35% of internal four-sided modules with legs are removed without reducing the overall assembly strength and resultant internal void areas are covered by a four-sided shaped top slab larger than the resultant void area of the removed module(s), said four-sided shaped top slab having a notch down on its bottom side that is smaller than the void area to lock it in place within the assembly.

39. A four-sided tessellation assembly system of claim 30, where the top access hole is covered with an access frame and cover and includes access risers to extend the access frame and cover to finish surface from the top access hole located underground.

40. A four-sided tessellation assembly system of claim 30, made water tight using an impervious liner, sealant or other means to prevent leakage.

41. A four-sided tessellation assembly system of claim 30, where the top access hole is covered with an access frame and cover.

* * * * *